United States Patent
Raghavan et al.

(10) Patent No.: US 11,031,987 B2
(45) Date of Patent: Jun. 8, 2021

(54) QUASI-LINEAR ANTENNA PLACEMENT IN MILLIMETER WAVE SYSTEMS

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/583,709

(22) Filed: Sep. 26, 2019

(65) Prior Publication Data

US 2020/0106508 A1    Apr. 2, 2020

Related U.S. Application Data

(60) Provisional application No. 62/738,939, filed on Sep. 28, 2018.

(51) Int. Cl.
| | |
|---|---|
| *H04W 4/00* | (2018.01) |
| *H04B 7/06* | (2006.01) |
| *H01P 1/18* | (2006.01) |
| *H01Q 21/06* | (2006.01) |

(52) U.S. Cl.
CPC .......... *H04B 7/0695* (2013.01); *H01P 1/18* (2013.01); *H01Q 21/065* (2013.01)

(58) Field of Classification Search
None
See application file for complete search history.

(56) References Cited

U.S. PATENT DOCUMENTS

| | | | |
|---|---|---|---|
| 6,538,603 B1 * | 3/2003 | Chen | H01P 1/181 342/372 |
| 10,447,375 B1 * | 10/2019 | Padhy | H04B 7/0695 |
| 2018/0115958 A1 | 4/2018 | Raghavan et al. | |
| 2018/0233808 A1 * | 8/2018 | Noori | H01Q 1/2266 |
| 2018/0277963 A1 | 9/2018 | Desclos et al. | |
| 2019/0140362 A1 * | 5/2019 | Edenfield | H01Q 23/00 |

OTHER PUBLICATIONS

International Search Report and Written Opinion—PCT/US2019/053503—ISA/EPO—dated Jan. 28, 2020.
Partial International Search Report—PCT/US2019/053503—ISA/EPO—dated Dec. 2, 2019.

* cited by examiner

*Primary Examiner* — Phuongchau Ba Nguyen
(74) *Attorney, Agent, or Firm* — Qualcomm Incorporated

(57) ABSTRACT

Methods, systems, and devices for wireless communications are described. A user equipment (UE) may include a set of patch antennas in a quasi-linear arrangement along a top linear edge and one or more side linear edges of the UE in addition to a curved part between the two linear edges. For example, a first subset of the patch antennas may be linearly arranged on a first edge along the UE (e.g., the top of the UE), a second subset of the patch antennas may be linearly arranged along a second edge of the UE that is at an angle relative to the first edge (e.g., a side of the UE), and at least one patch antenna may be non-linearly arranged (e.g., quasi-linearly) on a curved line formed between the first subset of the patch antennas and the second subset of the patch antennas.

29 Claims, 16 Drawing Sheets

1305 — Control a set of phase shifters to transmit or receive respective phase shifted versions of signals over directional beams across a two dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle relative to the first subset of patch antennas, and at least one patch antenna of the set of patch antennas being positioned in a non-linear arrangement relative to a first line formed by patch antennas included within the first subset and to a second line formed by patch antennas included within the second subset 1310 — Select a direction within the two dimensional space in which to transmit or receive based on beam sweeping transmission or reception of the respective phase shifted versions of the signals via the set of patch antennas

QUASI-LINEAR ANTENNA PLACEMENT IN MILLIMETER WAVE SYSTEMS

CROSS REFERENCE

The present Application for Patent claims the benefit of U.S. Provisional Patent Application No. 62/738,939 by RAGHAVAN, et al., entitled "QUASI-LINEAR ANTENNA PLACEMENT IN MILLIMETER WAVE SYSTEMS," filed Sep. 28, 2018, assigned to the assignee hereof, and expressly incorporated by reference herein.

BACKGROUND

The following relates generally to wireless communications, and more specifically to quasi-linear antenna placement in millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., mmW systems), a base station and a UE may use multiple antennas for transmitting and receiving signals. For example, the multiple antennas may be used for beamforming techniques to bridge a link budget between the base station and the UE in order to increase gains and reduce losses in the system. In some cases, the UE may be form-factor constrained such that placing a large number of antennas to use for the beamforming techniques on a side of the UE is not possible or difficult to accommodate. Alternatively, small linear antenna arrays may be placed at different positions on the UE (e.g., at modules on the UE) for transmitting and receiving signals (e.g., via the beamforming techniques). However, the small linear antenna arrays may be inefficient or suboptimally placed based on the UE construction. Additionally, both the base station and the UE may have additional power consumption considerations, such that placing the multiple small linear antenna arrays around the UE may impact power consumption levels at either device.

SUMMARY

The described techniques relate to improved methods, systems, devices, and apparatuses that support quasi-linear antenna placement in millimeter wave (mmW) systems. Generally, the described techniques provide for positioning a set of antenna elements (e.g., patch antennas) on a user equipment (UE) in a quasi-linear arrangement along a top linear edge and one or more side linear edges of the UE in addition to a curved part between the two linear edges. For example, a first subset of patch antennas may be linearly arranged on a first edge along the UE (e.g., the top of the UE), a second subset of patch antennas may be linearly arranged along a second edge of the UE that is at an angle relative to (e.g., orthogonal to) the first edge (e.g., a side of the UE), and at least one patch antenna may be non-linearly arranged (e.g., quasi-linearly) on a curved line formed between a first line of the first subset of the patch antennas and a second line of the second subset of the patch antennas. Additionally, a set of phase shifters may be coupled to each patch antenna in the set of patch antennas, where a controller steers beams for communication of signals through the coupled phase shifters and patch antennas.

Accordingly, the UE may perform a beam scanning in a two-dimensional plane by steering beams from the quasi-linearly arranged patch antennas with the coupled phase shifters. In some cases, a precoder may also precode signals to generate a first spatial layer signal and a second spatial layer signal. For the linear sections of the set of patch antennas, a phase shifter may be associated with each spatial layer for transmitting the precoded signal. Additionally or alternatively, for the non-linear arranged patch antennas, a phase shifter may combine the spatial layers into a single signal transmitted on the patch antennas.

An apparatus for wireless communication is described. The apparatus may include a set of patch antennas serially positioned along a perimeter of a housing of the apparatus, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset; a set of phase shifters, where each phase shifter of the set of phase shifters is electrically coupled to a respective patch antenna of the set of patch antennas; and a controller electrically coupled to the set of phase shifters and configured to control communication of signals via the set of patch antennas and the set of phase shifters.

A method of wireless communication is described. The method may include controlling a set of phase shifters to transmit or receive respective phase shifted versions of signals over directional beams across a two-dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset; and selecting a direction within the two-dimensional space in which to transmit or receive based on beam sweeping transmission or reception of the respective phase shifted versions of the signals via the set of patch antennas.

Another apparatus for wireless communication is described. The apparatus may include means for controlling a set of phase shifters to transmit or receive respective phase shifted versions of signals over directional beams across a two-dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset; and means for selecting a direction within the two-dimensional space in which to transmit or receive based on beam sweeping transmission or reception of the respective phase shifted versions of the signals via the set of patch antennas.

A non-transitory computer-readable medium storing code for wireless communication is described. The code may include instructions executable by a processor to control a set of phase shifters to transmit or receive respective phase shifted versions of signals over directional beams across a two-dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset; and instructions executable by a processor to select a direction within the two-dimensional space in which to transmit or receive based on beam sweeping transmission or reception of the respective phase shifted versions of the signals via the set of patch antennas.

In some examples of the method, apparatuses, and non-transitory computer-readable medium described herein, the non-linear arrangement may be an arc defined by continuously mapping the first line with the second line.

In some examples of the method, apparatuses, and non-transitory computer-readable medium described herein, a signal generator may be electrically coupled to the set of phase shifters and configured to generate the signals, where the controller may be configured to cause the set of phase shifters to output respective phase shifted versions of the signals to the set of patch antennas, and the set of patch antennas may be configured to wirelessly emit the respective phase shifted versions of the signals.

Some examples of the method, apparatuses, and non-transitory computer-readable medium described herein may further include operations, features, means, or instructions for controlling the set of phase shifters to transmit the signals over directional beams across a two-dimensional space via the set of patch antennas, receiving feedback from a receiving wireless device based on beam sweeping transmission of the respective phase shifted versions of the signals via the set of patch antennas across the two-dimensional space, and selecting a direction within the two-dimensional space in which to transmit to the receiving wireless device based on the feedback.

Some examples of the method, apparatuses, and non-transitory computer-readable medium described herein may further include operations, features, means, or instructions for generating a set of beam weights for the set of phase shifters based on the feedback.

In some examples of the method, apparatuses, and non-transitory computer-readable medium described herein, the controller may be configured to cause the set of phase shifters to output respective phase shifted versions of the signals received via the set of patch antennas.

Some examples of the method, apparatuses, and non-transitory computer-readable medium described herein may further include operations, features, means, or instructions for controlling the set of phase shifters to receive the signals over directional beams across a two-dimensional space via the set of patch antennas and selecting a direction within the two-dimensional space in which to receive a transmission from a transmitting wireless device based on beam sweeping reception of respective phase shifted versions of the signals received via the set of patch antennas across the two-dimensional space.

Some examples of the method, apparatuses, and non-transitory computer-readable medium described herein may further include operations, features, means, or instructions for generating a set of measurements based on beam sweeping reception of the respective phase shifted versions of the signals received via the set of patch antennas across the two-dimensional space, where selecting the direction may be based on the set of measurements.

Some examples of the method, apparatuses, and non-transitory computer-readable medium described herein may further include operations, features, means, or instructions for generating a set of beam weights for the set of phase shifters based on the set of measurements.

In some examples of the method, apparatuses, and non-transitory computer-readable medium described herein, the housing may be a rounded rectangle, the at least one patch antenna may be positioned in a rounded corner of the rounded rectangle, the first subset of patch antennas may be positioned along a first side of the rounded rectangle, and the second subset of patch antennas may be positioned along a second side of the rounded rectangle, where the set of patch antennas may be oriented in any direction.

In some examples of the method, apparatuses, and non-transitory computer-readable medium described herein, a precoder may be configured to precode the signals to generate a first spatial layer signal and a second spatial layer signal.

In some examples of the method, apparatuses, and non-transitory computer-readable medium described herein, a first phase shifter of the set of phase shifters may be electrically coupled to output a phase shifted version of the first spatial layer signal to a first polarization feed point and a second polarization feed point of the at least one patch antenna positioned in the non-linear arrangement, and a second phase shifter of the set of phase shifters may be electrically coupled to output a phase shifted version of the second spatial layer signal to the first polarization feed point and the second polarization feed point of the at least one patch antenna positioned in the non-linear arrangement.

In some examples of the method, apparatuses, and non-transitory computer-readable medium described herein, a first set of phase shifters of the set of phase shifters may be configured to output a respective phase shifted version of the first spatial layer signal to a respective first polarization feed point of the first subset of patch antennas, and a second set of phase shifters of the set of phase shifters may be configured to output a respective phase shifted version of the second spatial layer signal to a respective second polarization feed point of the first subset of patch antennas.

In some examples of the method, apparatuses, and non-transitory computer-readable medium described herein, a third set of phase shifters of the set of phase shifters may be configured to output a respective phase shifted version of the first spatial layer signal to a respective first polarization feed point of the second subset of patch antennas, and a fourth set of phase shifters of the set of phase shifters may be configured to output a respective phase shifted version of the second spatial layer signal to a respective second polarization feed point of the second subset of patch antennas.

In some examples of the method, apparatuses, and non-transitory computer-readable medium described herein, a first phase shifter of the set of phase shifters may be configured to output a first weighted combination of the first and second spatial layer signals to a first polarization feed point of the at least one patch antenna positioned in the non-linear arrangement, and a second phase shifter of the set of phase shifters may be configured to output a second weighted combination of the first and second spatial layer signals to a second polarization feed point of the at least one patch antenna positioned in the non-linear arrangement.

In some examples of the method, apparatuses, and non-transitory computer-readable medium described herein, weights for combining the first and second spatial layer signals to form the first weighted combination, the second weighted combination, or both, may be a function of a position of the at least one patch antenna relative to the first subset of patch antennas and the second subset of patch antennas.

In some examples of the method, apparatuses, and non-transitory computer-readable medium described herein, the set of patch antennas serially positioned along the perimeter of the housing may be a conformal array of patch antennas.

In some examples of the method, apparatuses, and non-transitory computer-readable medium described herein, the set of patch antennas serially positioned along the perimeter of the housing may be a set of dual-polarized patch antennas.

In some examples of the method, apparatuses, and non-transitory computer-readable medium described herein, the angle of the second subset of patch antennas relative to the first subset of patch antennas may be thirty degrees or greater and less than or equal to ninety degrees.

Some examples of the method, apparatuses, and non-transitory computer-readable medium described herein may further include operations, features, means, or instructions for receiving feedback from a receiving wireless device based on beam sweeping transmission of the respective phase shifted versions of the signals across the two-dimensional space via the set of patch antennas, where selecting the direction within the two-dimensional space may be based on the feedback.

Some examples of the method, apparatuses, and non-transitory computer-readable medium described herein may further include operations, features, means, or instructions for generating a set of measurements based on beam sweeping reception of the respective phase shifted versions of the signals across the two-dimensional space via the set of patch antennas, where selecting the direction may be based on the set of measurements.

Some examples of the method, apparatuses, and non-transitory computer-readable medium described herein may further include operations, features, means, or instructions for precoding the signals to generate a first spatial layer signal and a second spatial layer signal.

In some examples of the method, apparatuses, and non-transitory computer-readable medium described herein, controlling the set of phase shifters further may include operations, features, means, or instructions for outputting, by a first phase shifter of the set of phase shifters, a first weighted combination of the first spatial layer signal and the second spatial layer signal to a first polarization feed point of the at least one patch antenna positioned in the non-linear arrangement and outputting, by a second phase shifter of the set of phase shifters, a second weighted combination of the first spatial layer signal and the second spatial layer signal to a second polarization feed point of the at least one patch antenna positioned in the non-linear arrangement.

In some examples of the method, apparatuses, and non-transitory computer-readable medium described herein, controlling the set of phase shifters further may include operations, features, means, or instructions for outputting, by a first subset of the set of phase shifters, a respective phase shifted version of the first spatial layer signal to a respective first polarization feed point of the first subset of patch antennas and outputting, by a second subset of the set of phase shifters, a respective phase shifted version of the second spatial layer signal to a respective second polarization feed point of the first subset of patch antennas.

In some examples of the method, apparatuses, and non-transitory computer-readable medium described herein, controlling the set of phase shifters further may include operations, features, means, or instructions for outputting, by a third subset of the set of phase shifters, a respective phase shifted version of the first spatial layer signal to a respective first polarization feed point of the second subset of patch antennas and outputting, by a fourth subset of the set of phase shifters, a respective phase shifted version of the second spatial layer signal to a respective second polarization feed point of the second subset of patch antennas.

BRIEF DESCRIPTION OF THE DRAWINGS

FIGS. 13 through 16 show flowcharts illustrating methods that support quasi-linear antenna placement in mmW systems in accordance with aspects of the present disclosure.

DETAILED DESCRIPTION

The described techniques provide for positioning a set of antenna elements on a user equipment (UE) in a quasi-linear arrangement along a top linear edge and one or more side linear edges of the UE in addition to a curved part between the two linear edges. Beneficially, the antenna arrangement may enable two-dimensional beam scanning for the UE.

In some wireless communications systems (e.g., mmW systems), a base station and a user equipment (UE) may use multiple antennas for transmitting and receiving signals. To enable efficient communications, a set of antenna elements, such as patch antennas, dipole antennas, or the like, may be positioned on the UE in a quasi-linear arrangement along a top linear edge and one or more side linear edges of the UE in addition to a curved part between the two linear edges. For example, a first subset of patch antennas may be linearly arranged on a first edge along the UE (e.g., the top of the UE), a second subset of patch antennas may be linearly arranged along a second edge of the UE that is at an angle relative to (e.g., orthogonal to) the first edge (e.g., a side of the UE), and at least one patch antenna may be non-linearly arranged (e.g., quasi-linearly) on a curved line formed between a first line of the first subset of the patch antennas and a second line of the second subset of the patch antennas. Additionally, a set of phase shifters may be coupled to each patch antenna in the set of patch antennas, where a controller steers beams for communication of signals through the coupled phase shifters and patch antennas. Accordingly, the UE may perform a beam scanning in a two-dimensional plane by steering beams from the quasi-linearly arranged patch antennas with the coupled phase shifters. In some cases, a precoder may also precode signals to generate a first spatial layer signal and a second spatial layer signal. For the linear sections of the set of patch antennas, a phase shifter may be associated with each spatial layer for transmitting the precoded signal. Additionally or alternatively, for the non-linear arranged patch antennas, a phase shifter may combine the spatial layers into a single signal transmitted on the patch antennas.

Aspects of the disclosure are initially described in the context of a wireless communications system. Additional aspects of the disclosure are illustrated through examples of antenna configurations, a quasi-linear or curvilinear antenna design, a signal transmission, a signal reception, and a process flow. Aspects of the disclosure are further illustrated by and described with reference to apparatus diagrams, system diagrams, and flowcharts that relate to quasi-linear antenna placement in mmW systems.

Figure 1:
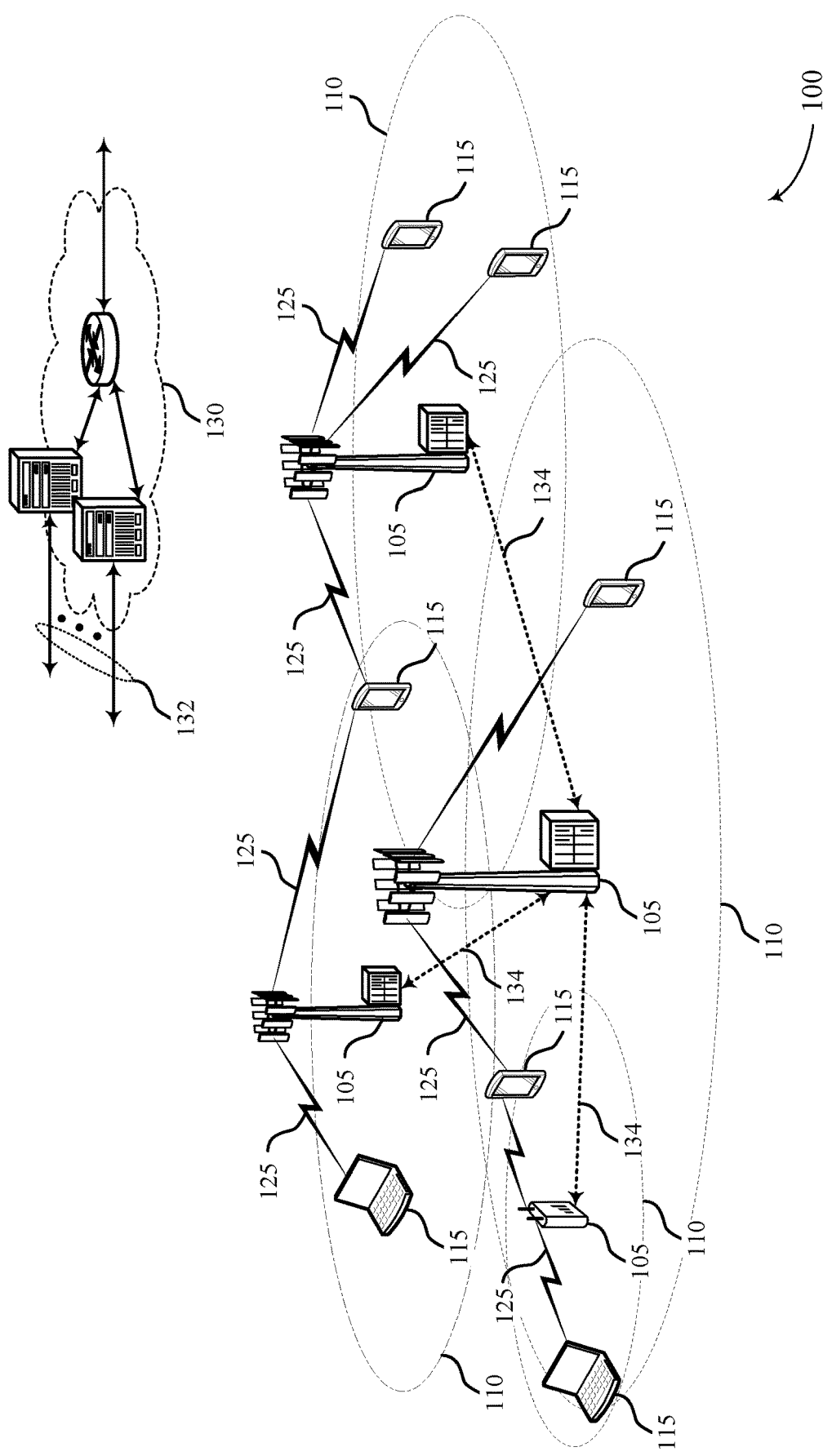
FIG. 1 illustrates an example of a system for wireless communications that supports quasi-linear antenna placement in millimeter wave (mmW) systems in accordance with aspects of the present disclosure.

FIG. 1 illustrates an example of a wireless communications system 100 that supports quasi-linear antenna placement in mmW systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As described above, wireless communications system 100 may employ beamforming techniques for communications between a UE 115 and a base station 105. In some cases, the UE 115 may receive one or more beams from a base station 105 or transmit one or more beams to the base station 105. In order to form the beams, the base station 105 and the UE 115 may use multiple antennas (e.g., antenna elements, patch antennas, antenna arrays, etc.). Using the multiple antennas for beamforming may bridge a link budget (e.g., a received signal power based on a transmitted power, gains, and losses) between a transmitting device and a receiving device. For example, for downlink transmissions, the base station 105 may transmit a signal on a beam that is received by the UE 115 such that propagation losses are minimized between the base station 105 (e.g., transmitter) and the UE 115 (e.g., the receiver). Small linear antenna arrays may be placed at different positions around the UE 115 to transmit and receive signals according to the beamforming techniques. However, the UE 115 may have form-factor constraints that limit the number of antennas that are placed at the different positions of the UE 115. Additionally, the number of antennas placed in the UE 115 may be limited due to power consumption considerations of the UE 115 and/or base station 105.

In some cases, multiple antenna subarrays or multi-dimensional planar antenna arrays may be placed around the UE 115 such that a wider area may be scanned for detecting downlink signaling and/or available base stations 105 for uplink signaling. For example, each antenna array may scan one dimension, where each antenna array faces a different directions and scans a corresponding single dimension. The UE 115 may then combine each dimension from each antenna array to form a wider area in multiple dimensions for scanning for subsequent communications. Additionally or alternatively, antenna arrays with different configurations may be placed such that antennas are placed on more than one plane (e.g., arranged in multiples rows and columns), enabling two-dimension scanning based on the more than one plane. However, the form-factor constraints may limit the feasibility of placing the multiple antenna subarrays around the UE 115. Additionally, the planar antenna arrays may occupy unnecessary space and/or use more antenna elements (e.g., increasing latency at the UE 115 by using more antenna elements to transmit, receive, or process a signal and scanning in multiple dimensions).

Wireless communications system 100 may support efficient placement of patch antennas on a UE 115 to enable a two-dimensional beam sweeping procedure with a single patch antenna array placed in the UE 115. For example, the UE 115 may have a form factor with curved edges such that patch antennas may be placed on the curved edges of the UE 115 as well as linear edges. In some cases, a number of patch antennas (e.g., 16) may be placed over the top edge of the UE 115 and the top corners of the UE 115. Additionally or alternatively, two sets of patch antennas may be placed at either top corner edge of the UE 115. Accordingly, in both cases, a first subset of patch antennas may be linearly placed along the perimeter of the UE 115, a second subset of patch antennas may be linearly placed along the perimeter of the UE 115 at an angle relative to (e.g., orthogonally) the first subset of patch antennas, and at least one patch antenna may be placed non-linearly (e.g., quasi-linearly) relative to a curved line (e.g., arc) formed between the linear placements of the first subset of patch antennas and the second subset of patch antennas. For example, the at least one non-linearly placed patch antenna may be placed on an arc that connects an end of a first line associated with the first subset of patch antennas and an end of a second line associated with the second subset of patch antennas.

Additionally, a phase shifter may be coupled to each patch antenna to enable beam steering to scan two-dimensionally in the system. In some cases, a precoder may also be used to generate a first spatial layer signal and a second spatial layer signal to be transmitted by separate polarization feed points of the patch antenna, where a first phase shifter and a second phase shifter may be coupled to each patch antenna and each phase shifter is associated with a separate spatial layer signal. If the patch antenna is placed in the non-linear position, then the spatial layer signals may be combined for signal transmissions from each polarization feed point of the patch antenna.

Figure 2A:
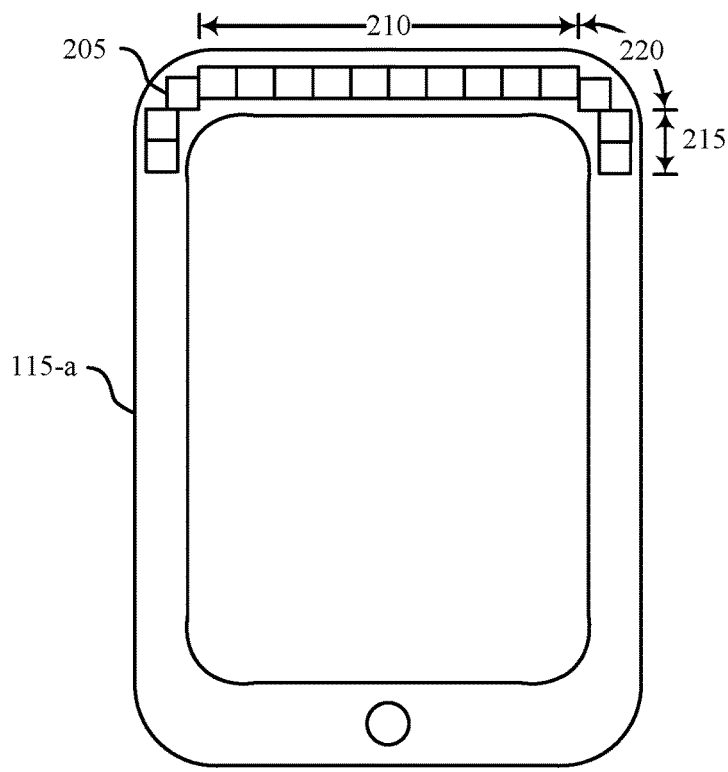
FIGS. 2A and 2B illustrate example of antenna configurations that support quasi-linear antenna placement in mmW systems in accordance with aspects of the present disclosure.
Figure 2B:
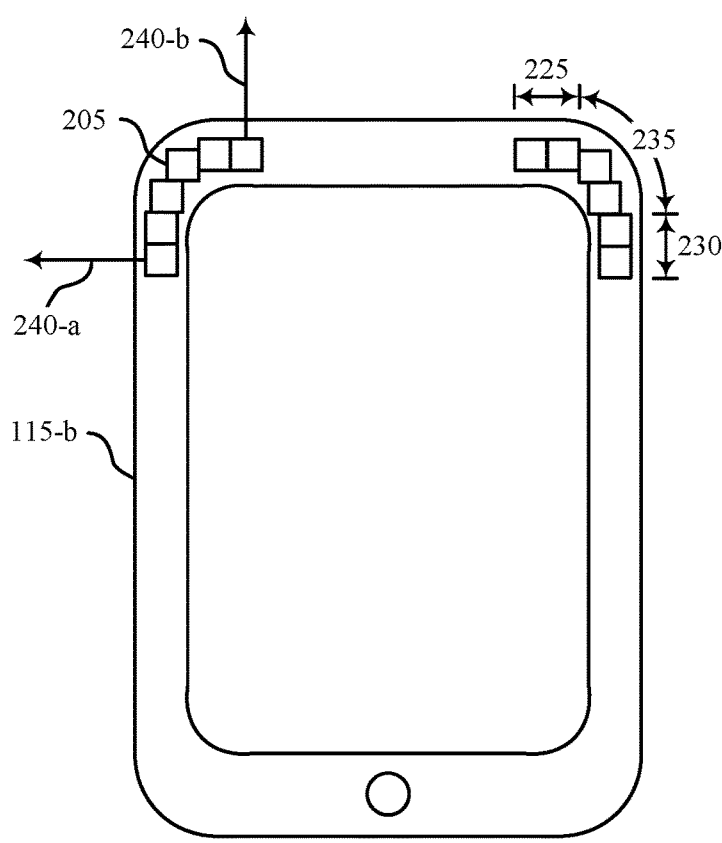

FIGS. 2A and 2B illustrate examples of antenna configurations 200 and 201 that support quasi-linear antenna placement in mmW systems in accordance with aspects of the present disclosure. In some examples, antenna configurations 200 and 201 may implement aspects of wireless communications system 100. Antenna configurations 200 and 201 may be utilized for a UE 115-a and a UE 115-b, respectively, which may be examples of UEs 115 as described above with reference to FIG. 1.

A typical UE 115 may have a first width dimension (e.g., about 65 mm) and curves at the corners rather than sharp edges (e.g., 90 degree angles). The first width dimension of the UE 115 may enable two to eight antennas based on the frequency (e.g., 24-30 GHz). However, link budgets may be affected by the number of antennas in the UE 115. For example, the array gain for downlink signals and equivalent isotropically radiated power (EIRP) for uplink signals may be limited by the number of antennas in the UE 115. To improve link budget, more antennas may be placed at the sides (e.g., on the edges) of the UE 115. Conventionally, the UE 115 is form-factor constrained such that placing a large number of antennas at the side of the UE 115 is difficult. Additionally, power consumption considerations may limit the number of antennas placed in the UE 115.

However, the form factor of the UE 115 may include the curved edges that have not conventionally been used for antenna placement. As described herein, antennas may be placed on top of a substrate underneath the casing of the UE 115, and the material of the casing may be curved rather than linear or straight. Accordingly, antennas may be placed over linear sections of the UE 115 as well as curved parts of the edges of the UE 115.

Antenna configuration 200 on UE 115-a illustrates a first example of a set of patch antennas 205 placed over a top edge of UE 115-a as well as curved corners and down the side of UE 115-a, where the set of patch antennas 205 are part of one antenna array (e.g., a single row antenna array, a set of serially arranged patch antennas, etc.). For example, a first subset of the set of patch antennas 205 may be placed on the top edge according to a first linear arrangement 210 on UE 115-a. Additionally, a second subset of the set of patch antennas 205 may be placed down the side edge of UE 115-a according to a second linear arrangement 215 that is at an angle relative to (e.g., orthogonal to) the first linear arrangement 210. For example, the angle between the first linear arrangement 210 and the second linear arrangement 215 may be thirty degrees or greater and less than or equal to ninety degrees. Further, at least one patch antenna 205 of the set of patch antennas may be placed in a non-linear arrangement 220 (e.g., quasi-linearly) on an arc defined by connecting a first line formed by the first linear arrangement 210 and a second line formed by the second linear arrangement 215. In some cases, the set of patch antennas 205 in antenna configuration 200 may include 16 patch antennas 205 that are part of the one antenna array (e.g., serially arranged, for example, in a single row). Accordingly, antenna configuration 200 may increase an array gain for UE 115-a as the maximum number of antennas are packed on one edge of UE 115-a. While patch antennas are illustrated and described in antenna configuration 200, it is to be understood other types of antennas may be used (e.g., dipoles). Additionally, in some cases, patch antennas 205 may be referred to as antenna elements. Further, other antenna configurations and orientations may be used.

Antenna configuration 201 on UE 115-b illustrates another example of patch antennas 205 placed quasi-linearly on UE 115-b. Alternative to antenna configuration 200, antenna configuration 201 may include two sets of patch antennas 205 placed on either corner of UE 115-b according to two antenna arrays. For example, a first set of patch antennas 205 may be placed at the left curved edge of the front face of UE 115-b, and a second set of patch antennas 205 may be placed at the right curved edge of the front face of UE 115-b. In other cases, a set of patch antennas may be placed on any edge of UE 115-b (e.g., at the curved edges of the sides of UE 115-b). Similar to antenna configuration 200, each set of patch antennas 205 may follow a quasi-linear arrangement for antenna configuration 201. For example, a first subset of each of the sets of patch antennas 205 may be placed on the top edge according to a first linear arrangement 225 on UE 115-b. Additionally, a second subset of each set of patch antennas 205 may be placed down the side of UE 115-b according to a second linear arrangement 230 that is at an angle relative to (e.g., orthogonal, thirty degrees or greater and less than or equal to ninety degrees, etc.) the first linear arrangement 225. Further, at least one patch antenna 205 of each set of patch antennas may be placed in a non-linear arrangement 235 (e.g., quasi-linearly) on an arc defined by connecting a first line formed by the first linear arrangement 225 and a second line formed by the second linear arrangement 230. In some cases, each set of patch antennas 205 in antenna configuration 201 may include six (6) patch antennas 205. Accordingly, antenna configuration 201 may leverage straight and curved edges of UE 115-b. As described herein, the set of patch antennas 205 in antenna configuration 200 and the two sets of patch antennas 205 in antenna configuration 201 may be arranged based on a quasi-linear or non-linear antenna array.

Patch antennas 205 may be at any edge of the UE 115-b and may be configured in any orientation. Each patch antenna 205 may be associated with a boresight 240 which may correspond to the orientation of the patch antenna 205. For example, the patch antennas 205 at the top edge of UE 115-b may be oriented towards the top of the page as illustrated by boresight 240-b and the patch antennas 205 at the left side edge of UE 115-b may be oriented toward the left side of the page as illustrated by boresight 240-a. In other examples, the boresights 240 of the patch antennas 205 may be toward the user or, in other examples, away from the user.

The quasi-linear antenna array designs (e.g., antenna configurations 200 and 201) may allow fitting more antennas in the same form factor than purely linear antenna array designs. For example, the quasi-linear antenna array designs may utilize real estate (e.g., space) within the UE 115 more efficiently by fully exploiting corners of the UE 115. Additionally, the quasi-linear antenna array designs may exhibit a higher signal communication robustness due to less hand blockage (e.g., signal transmissions and receptions may not be blocked or are less likely to be obstructed by a user's hand based on the quasi-linear antenna array designs). In some cases, beamformed transmissions may be susceptible to being blocked by a hand holding the UE 115 due to the shortened wavelengths (e.g., mmW) being unable to penetrate the hand. As such, the quasi-linear antenna array designs at the top and corners of the UE 115 may purposefully avoid areas of the UE 115 that are commonly held by a user (e.g., the sides of the UE 115), thereby reducing the effect of signals being interfered with or otherwise obstructed based on the user's hand placement.

In some cases, the linear part(s) of the quasi-linear antenna array designs may be longer than the curved part in terms of the number of patch antennas 205. For example, in antenna configuration 200, the number of patch antennas in the first linear arrangement 210 and the second linear arrangement 215 may be greater than the number of patch antennas in the non-linear arrangement 220. Additionally or alternatively, in antenna configuration 201, the number of patch antennas in the first linear arrangement 210 and the second linear arrangement 215 may be greater than or equal to the number of patch antennas in the non-linear arrangement 235. Accordingly, the number of patch antennas in the linear arrangements and the curved arrangements may be symmetric or asymmetric.

Additionally, the quasi-linear antenna array designs may improve beam scanning for the UE 115. In conventional configurations, linear antenna arrays may allow beam scanning in one-dimension alone but may use less area of the UE 115 and a smaller number of patch elements (e.g., patch antennas 205) for the beam scanning. Additionally or alternatively, some types of antenna arrays (e.g., multi-dimensional planar antenna arrays) may allow beam scanning in two-dimensions based on having antennas in two dimensions (e.g., rows and columns) but may use more area of the UE 115 and more antenna elements. While the linear antenna arrays minimize the area taken up by the UE 115 and a smaller number of antenna elements for the beam scanning, only scanning in one-dimension may limit the effectiveness of the antenna arrays. Additionally or alternatively, while the multi-dimensional planar antenna arrays enable two-dimensional beam scanning, such arrays occupy more space within the UE 115 and use more antenna elements, impacting the layout of the UE 115 and the latency at the UE 115 based on scanning the one beam across two dimensions. The quasi-linear antenna array designs as described herein may enable two-dimensional scanning with a single continuous form factor (e.g., single antenna array on one face of the UE 115, single row of patch antennas, serially arranged set of patch antennas, etc.) and with a smaller number of antenna elements for the scanning. The planar field available for two-dimensional beam scanning may comprise or may be determined by the boresights 240 of the patch antennas 205.

The beam scanning may be enhanced using the quasi-linear antenna array designs described herein through the use of phase shifters coupled to the patch antennas 205. In general, the phase shifters may adjust the amplitude and phases of signals to form receive beams and/or transmit beams at the UE 115 by applying a suitable set of antenna weights (e.g., beam weights) to signals received by each patch antenna 205. For example, each antenna weight may be a respective phase shift value applied by a respective phase shifter. Accordingly, the UE 115 may direct a beam in a plurality of different directions as part of the beam scanning procedure.

Figure 3:
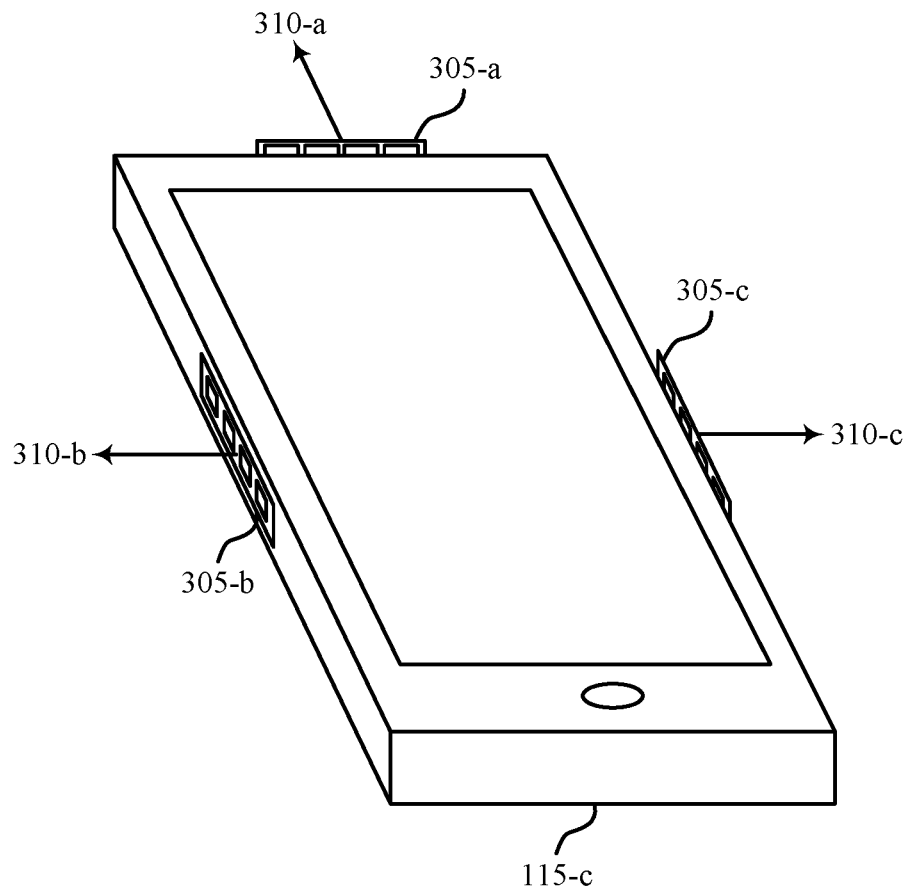
FIG. 3 illustrates an example of a conventional antenna placement in accordance with aspects of the present disclosure.

FIG. 3 illustrates an example of a conventional antenna placement 300 in accordance with aspects of the present disclosure. In some examples, conventional antenna placement 300 may implement aspects of wireless communications system 100. The conventional antenna placement 300 may illustrate how one or more antenna arrays 305 may be placed around a UE 115-c, which may be an example of a UE 115 as described above with reference to FIGS. 1-2. Each antenna array 305 may be a linear antenna array placed on a linear side/edge of UE 115-c. Additionally, each antenna array 305 may include a configuration of 1×4 antennas in the array (e.g., one (1) row of four (4) antennas each).

Antenna arrays 305 may be used for a UE construction based on efficiency, less area/form factor occupied, ease of codebook usage and design, ease of construction, etc. However, antenna arrays 305 may also have multiple deficiencies that limit communications to/from UE 115-c. For example, antenna arrays 305-b and 305-c are located on the sides of UE 115-c. As such, any transmitted uplink signals from antenna arrays 305-b and 305-c or any downlink signals to antenna arrays 305-b and 305-c may be blocked by a user's hand holding UE 115-c on or near the sides of UE 115-c. In some wireless communications systems, lower wavelengths (e.g., mmW) may be used as part of beamforming techniques for the communications between wireless devices (e.g., between UE 115-c and a base station 105). Accordingly, the shorter wavelength may be unable to penetrate or go through the user's hand, hindering communications.

Additionally, antenna arrays 305 may only perform beam sweeps in one-dimension to scan for downlink signals to receive or for available wireless devices for transmitting uplink signals. For example, antenna array 305-a may sweep in direction 310-a, antenna array 305-b may sweep in direction 310-b, and antenna array 305-c may sweep in direction 310-c. While not shown, antenna arrays 305 may also include different configurations of patch antennas in two dimensions (e.g., multi-dimensional planar antenna arrays). For example, the antenna arrays may include 2×2 antennas (e.g., two (2) rows of two (2) antennas), arrays of antennas on more than one plane of UE 115-c in different modules, or a similar configuration rather than a linear arrangement. In some cases, the planar antenna arrays may enable two-dimensional beam sweeping based on including the more than one plane of antennas. However, as described above, the planar antenna arrays may occupy more area in UE 115-c and increase latency for beamformed transmissions and receptions by using more antenna elements (e.g., patch antennas) in a beam sweeping procedure (e.g., more beams are scanned before appropriate beams are selected, increasing the time it takes for UE 115-c to process or transmit corresponding information).

As such, antenna arrays 305 may impact UE performance for communicating in certain wireless systems (e.g., mmW systems). As described herein, UE 115-c may include one or more antenna arrays with a quasi-linear arrangement that utilize the corners of UE 115-c in addition to the linear sections of the form factor of UE 115-c. Accordingly, the area occupied by the antenna arrays may be minimized and utilized more efficiently within UE 115-c while still enabling two-dimensional beam sweeping.

Figure 4:
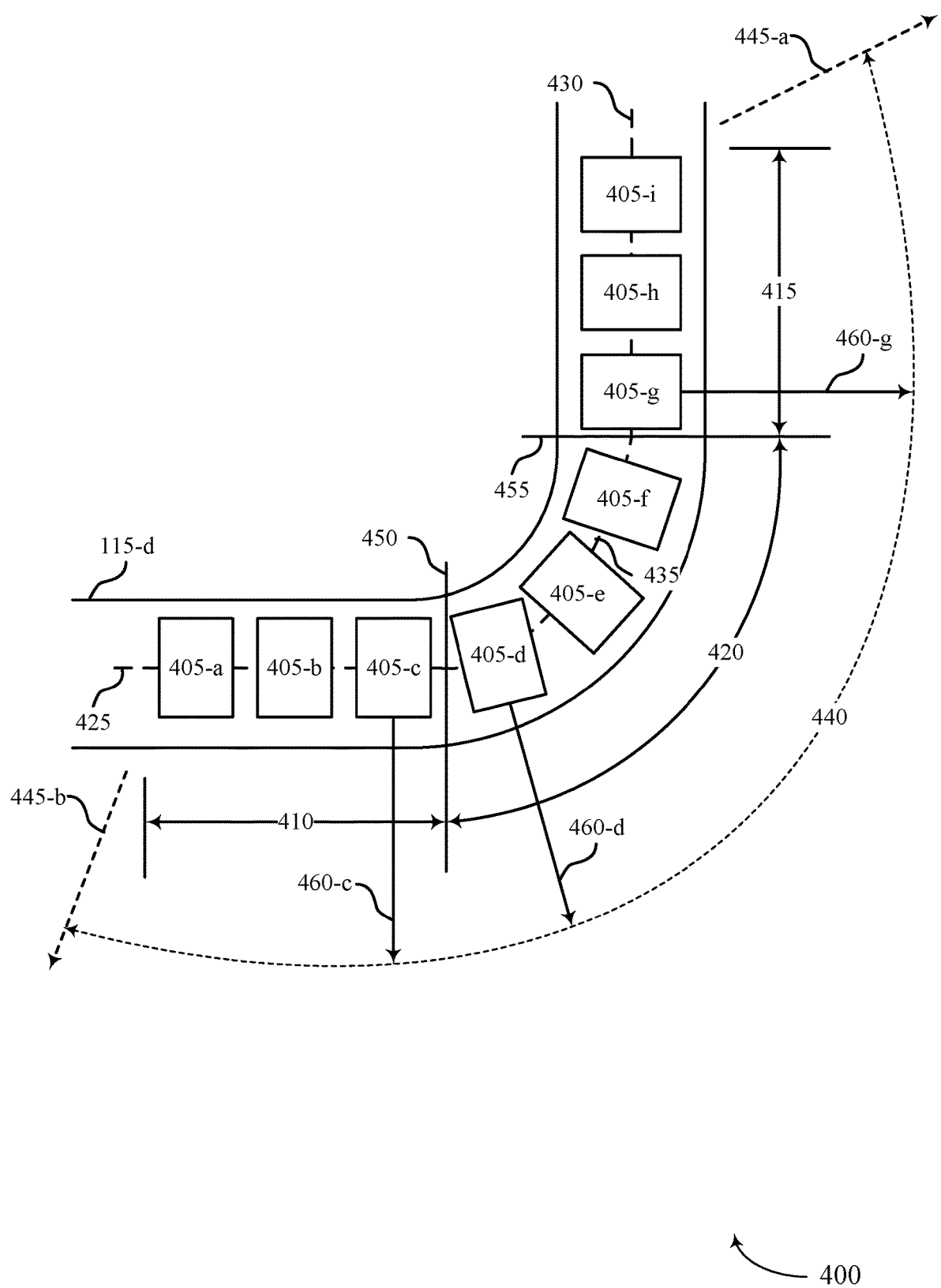
FIG. 4 illustrates an example of an antenna configuration on a curved edge that supports quasi-linear antenna placement in accordance with aspects of the present disclosure.

FIG. 4 illustrates one example of an antenna configuration 400 on a curved edge that supports quasi-linear antenna placement in accordance with aspects of the present disclosure. In some examples, antenna configuration 400 on a curved edge may implement aspects of wireless communications system 100. Antenna configuration 400 on a curved edge may be used for a UE 115-d, which may be an example of a UE 115 as described above with reference to FIGS. 1-3. Additionally, antenna configuration 400 may include a set of patch antennas 405 serially positioned (e.g., in a single string, sequence, chain, continuous line, etc.) along a perimeter of a housing of UE 115-d (e.g., quasi-linearly). For example, the serially positioned set of patch antennas 405 may be arranged in a series, rank, or row. In some cases, the set of patch antennas 405 serially positioned along the perimeter of the housing of UE 115-d may be a conformal array of patch antennas 405. The single row of patch antennas 405 may arc or be curved around at least a portion of the perimeter of UE 115-d, such that a single row of the serially positioned patch antennas 405 form at least one continuous line of patch antennas 405. Additionally or alternatively, the set of patch antennas 405 may be dual-polarized patch antennas.

As shown, a first subset 410 of patch antennas 405 (e.g., patch antennas 405-a, 405-b, and 405-c) from the set of patch antennas 405 may be linearly arranged along the perimeter. Additionally, a second subset 415 of patch antennas 405 (e.g., patch antennas 405-g, 405-h, and 405-i) from the set of patch antennas 405 may be linearly arranged along the perimeter and at an angle relative to (e.g., orthogonal to) the first subset 410 of patch antennas 405. In some cases, the angle between the first subset 410 and the second subset 415 of patch antennas 405 may be thirty degrees or greater and less than or equal to ninety degrees. It is noted that the first subset 410 and second subset 415 of patch antennas 405 may be placed substantially along respective lines, and the principles described herein apply even when there is an offset in the linear arrangement between patch antennas 405 in either of the first subset 410 and the second subset 415. Thus, the term line may provide for an offset from patch antenna to patch antenna within a linear arrangement.

In some cases, at least one patch antenna 405 (e.g., subset 420 including patch antennas 405-d, 405-e, and 405-f) of the set of patch antennas 405 may be positioned in a non-linear arrangement relative to a first line 425 formed by patch antennas 405 included within the first subset 410 and to a second line 430 formed by patch antennas 405 included within the second subset 415. For example, the non-linear arrangement may be an arc 435 defined by continuously mapping the first line 425 with the second line 430. In an example, continuously mapping may refer to the arc 435 connecting an end 450 of the first line 425 to an end 455 of the second line 430. For example, the arc 435 may be represented by a mathematical function that continuously maps the first line 425 with the second line 430, and at least one patch antenna 405 may be placed anywhere along the arc 435.

In some cases, UE 115-d may include a housing consisting of a rounded rectangle. Accordingly, the at least one patch antenna 405 may be positioned in a rounded corner of the rounded rectangle, the first subset 410 of patch antennas 405 may be positioned along a first side of the rounded rectangle, and the second subset 415 of patch antennas 405 may be positioned along a second side of the rounded rectangle.

Additionally, each patch antenna 405 may have one or more phase shifters electrically coupled to them to enable a beam sweeping transmission or reception in a two-dimensional space from UE 115-d. For example, a patch antenna 405 may be associated with a boresight 460 based on the orientation (e.g., angle) of the patch antenna 405 and UE 115-d may sweep beams across a two-dimensional space 440 (e.g., any direction between direction 445-a to direction 445-b) based on the directionality of boresights 460. The two-dimensional space 440 may comprise the two-dimensional plane created by the boresights 460 of the patch antennas 405. This two-dimensional sweeping may enable UE 115-d to scan a greater area for receiving downlink signals or identifying wireless devices for transmitting uplink signals with fewer beams, while using a single antenna array.

Antenna configuration 400 may illustrate patch antennas 405 with boresights 460 parallel to the face of UE 115-d and is not meant to be a comprehensive illustration of all antenna configurations or orientations of the present disclosure. For example, patch antennas 405 may be placed at any location along the edge of UE 115-d and may be at any angle with respect to the orientation depicted in antenna configuration 400 (e.g., a boresight 460 of a patch antenna 405 may be in any direction based on the angle of the patch antenna 405). Additionally or alternatively, the boresight 460 of a patch antenna 405 may be toward the user, or may be away from the user. In some cases, the patch antennas 405 may be placed at an angle due to size constraints based on the casing or size of UE 115-d. Accordingly, UE 115-d may sweep beams in two-dimensional spaces comprising different two-dimensional planes than the two-dimensional plane comprised by two-dimensional space 440.

Figure 5:
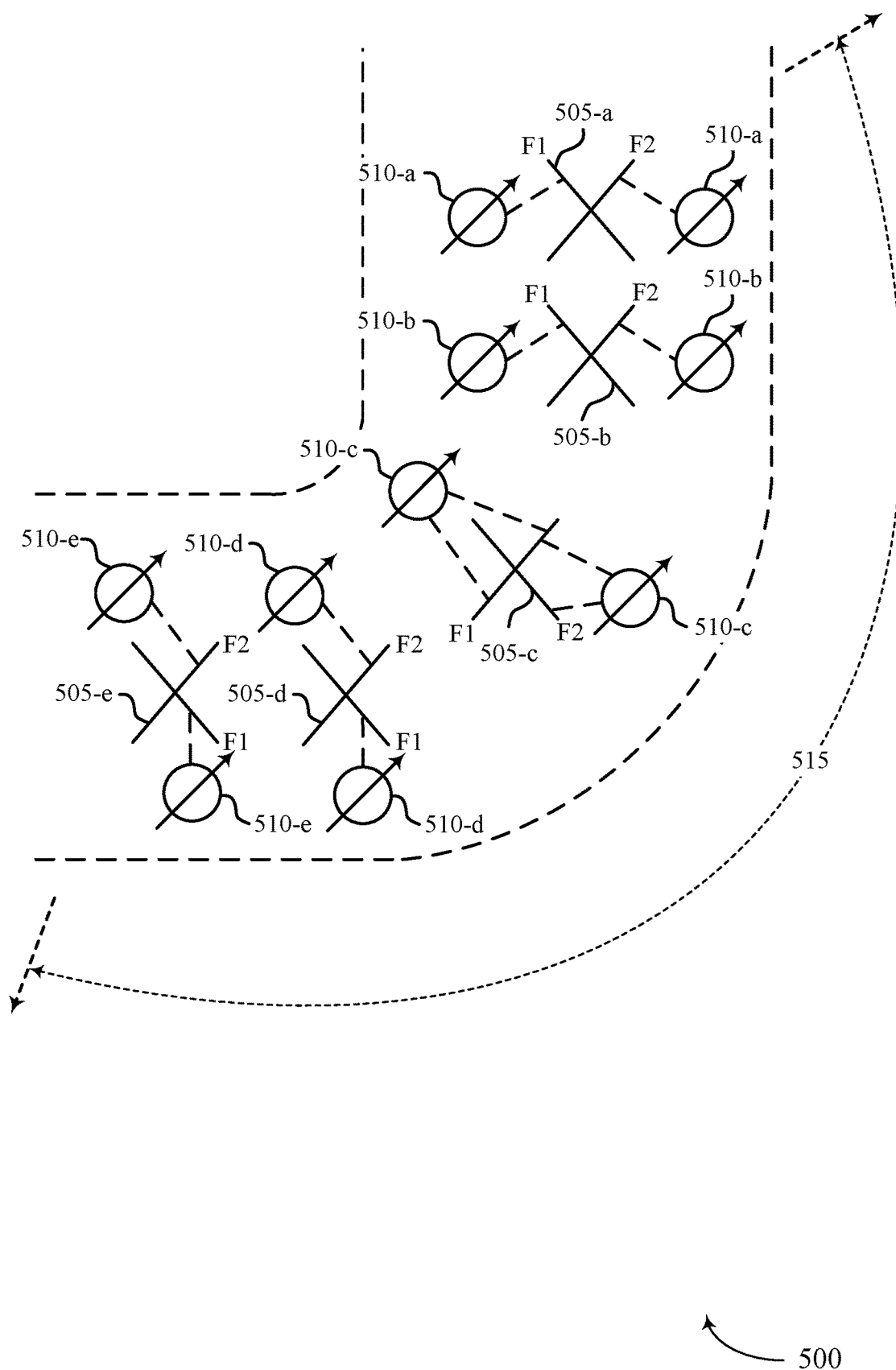
FIG. 5 illustrates an example of a quasi-linear/curvilinear antenna design that supports quasi-linear antenna placement in mmW systems in accordance with aspects of the present disclosure.

FIG. 5 illustrates an example of a quasi-linear/curvilinear antenna design 500 that supports quasi-linear antenna placement in mmW systems in accordance with aspects of the present disclosure. In some examples, quasi-linear/curvilinear antenna design 500 may implement aspects of wireless communications system 100. Quasi-linear/curvilinear antenna design 500 may be used for a UE 115 as described above with reference to FIGS. 1-4. Accordingly, quasi-linear/curvilinear antenna design 500 may include a set of patch antennas 505 positioned in a single quasi-linear row (e.g., serially positioned, in a continuous line, etc.) along a perimeter of a housing of the UE 115 as described in FIG. 4.

Additionally, a phase shifter 510 may be electrically coupled to a respective patch antenna 505 of the set of patch antennas 505. It is to be understood that the phase shifters 510 may be located in different positions relative to each patch antenna 505 (e.g., not on either side of each patch antenna 505). In some cases, more than one phase shifter 510 may be coupled to each patch antenna 505, such that separate phase shifters 510 output phase shifted signals to respective polarization feed points of each patch antenna 505. For example, patch antennas 505-a, 505-b, 505-d, and 505-e located in linear sections of the housing of the UE 115 may have two phase shifters 510 connected to separate polarization feed points of each patch antenna 505. Additionally or alternatively, patch antenna 505-c located in the non-linear section of the housing of the UE 115 may have phase shifters 510 each connected to both polarization feed points of patch antenna 505-c, where patch antenna 505-c combines signals from the phase shifters 510 and transmits the combined signal.

For the combinations of the signals, weights may be applied to parts of the combinations (e.g., different weights for different spatial layers) based on a location of patch antenna 505-c relative to the first subset of patch antennas (e.g., patch antennas 505-a and 505-b) and the second subset of patch antennas (e.g., patch antennas 505-d and 505-e) in the linear sections of the housing of the UE 115. In an example, the weighted signal may be defined by the following equation: $y = w_0 * L0 + w_1 * L1$, where y represents the combination signal, $w_0$ represents the weighting for a first spatial layer (L0) signal, and $w_1$ is the weighting applied to a second spatial layer (L1) signal. For example, if patch antenna 505-*c* is closer to the first subset of patch antennas, a first spatial layer signal (L0) may be weighted more heavily to be a larger component of the combination signal and a second spatial layer signal (L1) may be given a lower weight and, thus, is a smaller component of the combination signal (e.g., y=0.8*L0+0.2*L1, where $w_0$ for the first spatial layer, L0, is greater than $w_1$ for the second spatial layer, L1). If patch antenna 505-*c* is closer to the second subset of patch antennas, a second spatial layer (L1) signal may be weighted more heavily to be a larger component of the combination signal and a first spatial layer signal (L0) may be given a lower weight and, thus, is a smaller component of the combination signal (e.g., y=0.2*L0+0.8*L1). Additionally or alternatively, if patch antenna 505-*c* is in the middle of the two subsets of patch antennas, the parts of the combination signal may be equally weighted (e.g., y=0.5*L0+0.5*L1).

In general, for the linear sections of the UE 115, different layers (e.g., Layer 0, L0, and Layer 1, L1) may be connected with orthogonal polarizations of patch antennas 505. Additionally or alternatively, both layers (e.g., L0 and L1) may be fed with both polarizations of patch antennas 505 positioned in the non-linear (e.g., curved) sections. By placing one or more antennas in the curved sections of the UE 115, beam scanning gains and/or isolations may be improved for two-dimensional scanning in a two-dimensional space 515.

Figure 6:
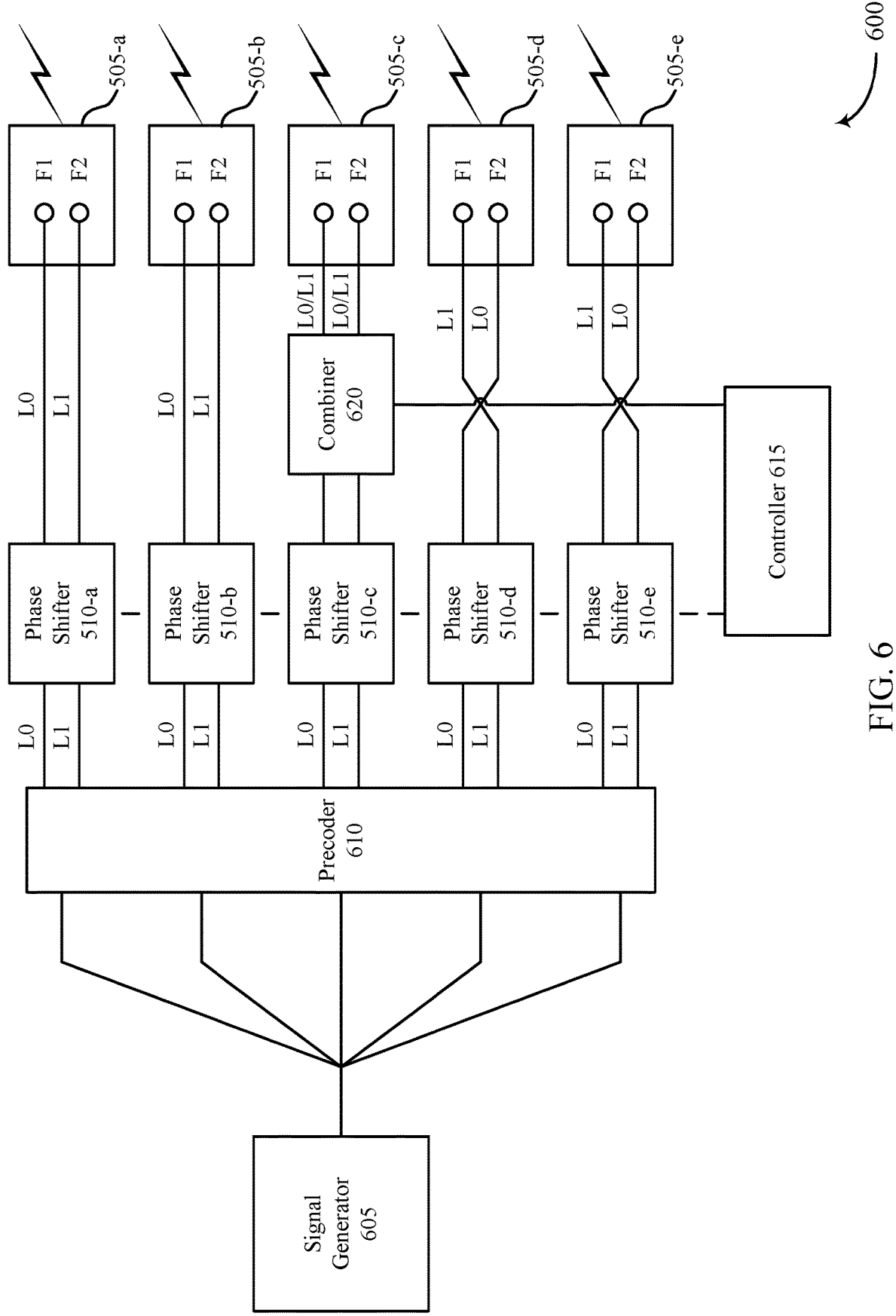
FIG. 6 illustrates an example of a signal transmission that supports quasi-linear antenna placement in accordance with aspects of the present disclosure.

FIG. 6 illustrates an example of a signal transmission 600 that supports the quasi-linear/curvilinear antenna design 500 with reference to FIG. 5 and in accordance with aspects of the present disclosure. In some examples, signal transmission 600 may implement aspects of wireless communications system 100. Signal transmission 600 may include the patch antennas 505 and phase shifters 510 as described above with reference to FIG. 5 of a UE 115, where the patch antennas are quasi-linearly arranged as described herein. In some cases, a controller 615 may be electrically coupled to the set of phase shifters 510 and be configured to control communication of signals via the set of patch antennas 505 and the set of phase shifters 510.

For signal transmission 600, a signal generator 605 may be electrically coupled to the set of phase shifters 510 and be configured to generate signals to be transmitted by the UE 115 over the set of patch antennas 505 (e.g., generate a signal for radio frequency (RF) transmissions). Additionally, controller 615 may be configured to cause the set of phase shifters 510 to output respective phase shifted versions of the signals to the set of patch antennas 505, and the set of patch antennas 505 may be configured to wirelessly emit the respective phase shifted versions of the signals. For example, controller 615 may be configured to cause the set of phase shifters 510 to output respective phase shifted versions of the signals received via the set of patch antennas 505.

In some cases, controller 615 may control the set of phase shifters to transmit the signals over directional beams across a two-dimensional space via the set of patch antennas 505. For example, as shown in FIG. 5, the two-dimensional space 515 may be utilized for transmitting the signals (e.g., or a different two-dimensional space determined by the boresights of the patch antennas 505). Subsequently, the UE 115 may receive feedback from a receiving wireless device (e.g., base station 105) based on a beam sweeping transmission of the respective phase shifted versions of the signals via the set of patch antennas 505 across the two-dimensional space. In some cases, the UE 115 may generate a set of beam weights (e.g., antenna weights, phase shift values, etc.) for the set of phase shifters 510 based on the feedback. Additionally, the UE 115 may select a direction within the two-dimensional space in which to transmit to the receiving wireless device based on the feedback (e.g., using the set of beam weights). A beam weight may correspond to a particular phase shift to apply to a signal, an amplitude weighting to apply to a signal, or both, to use for a particular patch antenna 505.

Additionally or alternatively, the UE 115 may include a precoder 610 that is configured to precode the signals to generate a first spatial layer signal (L0) and a second spatial layer signal (L1). After precoding, a phase shifter 510-*c* may be electrically coupled to output a phase shifted version of L0 to a first polarization feed point (F1) and a second polarization feed point (F2) of the at least one patch antenna 505 positioned in the non-linear arrangement (e.g., patch antenna 505-*c*). Additionally, a phase shifter 510-*c* may be electrically coupled to output a phase shifted version of L1 to F1 and F2 of patch antenna 505-*c*. While a single block is shown for phase shifter 510-*c* in FIG. 5, in some cases, a first phase shifter 510 may output a phase shifted version of L0 to F1 and F2 of patch antenna 505-*c*, and a second phase shifter 510 may output a phase shifted version of L1 to F1 and F2 of patch antenna 505-*c*.

In some cases, phase shifter 510-*c* may be configured to output a first weighted combination of L0 and L1 to F1 of patch antenna 505-*c*, and phase shifter 510-*c* may also be configured to output a second weighted combination of L0 and L1 to F2 of patch antenna 505-*c*. As noted above, the weights for combining L0 and L1 to form the first weighted combination, the second weighted combination, or both, may be a function of a position of patch antenna 505-*c* relative to the first subset of patch antennas and the second subset of patch antennas. A combiner 620 may combine L0 and L1 based on the determined weighted combination prior to transmitting the combined signal on patch antenna 505-*c*. In some cases, controller 615 may control combiner 620 in addition to the set of phase shifters 510.

For patch antennas 505 in the first subset of patch antennas (e.g., patch antennas 505-*a* and 505-*b*), a first set of phase shifters 510 of the total set of phase shifters 510 (e.g., phase shifters 510-*a* and 510-*b*) may be configured to output a respective phase shifted version of L0 to a respective F1 of the first subset of patch antennas 505. Additionally, a second set of phase shifters 510 of the total set of phase shifters 510 (e.g., phase shifters 510-*a* and 510-*b*) may be configured to output a respective phase shifted version of L1 to a respective F2 of the first subset of patch antennas 505.

For patch antennas 505 in the second subset of patch antennas (e.g., patch antennas 505-*d* and 505-*e*), a third set of phase shifters 510 of the total set of phase shifters 510 (e.g., phase shifters 510-*d* and 510-*e*) may be configured to output a respective phase shifted version of L1 to a respective feed point F1 of the second subset of patch antennas 505. Additionally, a fourth set of phase shifters 510 of the total set of phase shifters 510 (e.g., phase shifters 510-*d* and 510-*e*) may be configured to output a respective phase shifted version of L0 to a respective F2 of the first subset of patch antennas 505. As can be seen with reference to FIGS. 5 and 6, the L0 and L1 signals are fed into converse (e.g., opposite) feed points in the first subset of patch antennas relative to the second subset of patch antennas, due to the first subset of patch antennas being on an edge of UE 115 that is orthogonal to the edge of UE 115 that includes the second subset of patch antennas (e.g., or at a different angle between the first subset of patch antennas and the second subset of patch antennas).

Figure 7:
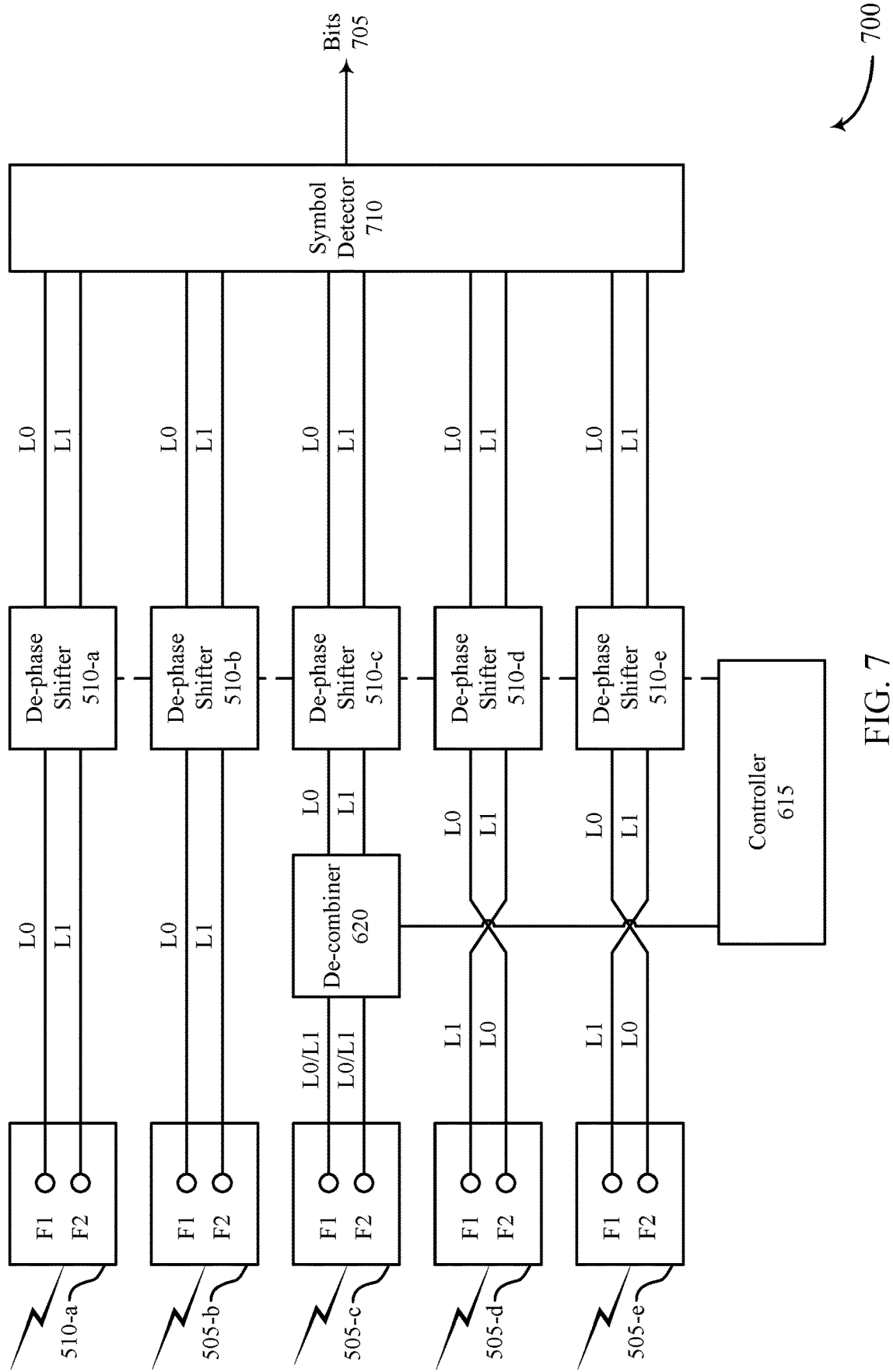
FIG. 7 illustrates an example of a signal reception that supports quasi-linear antenna placement in accordance with aspects of the present disclosure.

FIG. 7 illustrates an example of a signal reception 700 that supports the quasi-linear/curvilinear antenna design 500 with reference to FIG. 5 and in accordance with aspects of the present disclosure. In some examples, signal reception 700 may implement aspects of wireless communications system 100. Signal reception 700 may include the patch antennas 505 and phase shifters 510 as described above with reference to FIGS. 5-6 of a UE 115, where the patch antennas are quasi-linearly arranged as described herein. Additionally, signal reception 700 may include the controller 615 and combiner 620 as described above with reference to FIG. 6. While the phase shifters 510 and combiner 620 are actively shifting and combining signals, respectively, for transmitting a signal in FIG. 6, it is to be understood that the same components may be used to undo the shifting and combining of signals when receiving a signal. Accordingly, in the context of FIG. 7, the corresponding components may be referred to as de-phase shifters 510 and a de-combiner 620.

When receiving a signal, controller 615 may control the set of phase shifters 510 to receive the signals over directional beams across the two-dimensional space 515, as described with reference to FIG. 5, via the set of patch antennas 505. In some cases, the UE 115 may select a direction within the two-dimensional space in which to receive a transmission from a transmitting wireless device (e.g., a base station 105) based on beam sweeping reception of respective phase shifted versions of the signals received via the set of patch antennas 505 across the two-dimensional space. Additionally, controller 615 may generate a set of measurements based on a beam sweeping reception of the respective phase shifted versions of the signals received via the set of patch antennas 505 across the two-dimensional space, where selecting the direction is based on the set of measurements. In some cases, controller 615 may generate a set of beam weights for the set of phase shifters 510 based on the set of measurements.

After the UE 115 receives the one or more signals via the patch antennas 505, the signals may be de-phase shifted and/or de-combined such that a symbol detector 710 outputs a set of bits 705 that the UE 115 identifies if any information is intended for itself and may respond accordingly.

Figure 8:
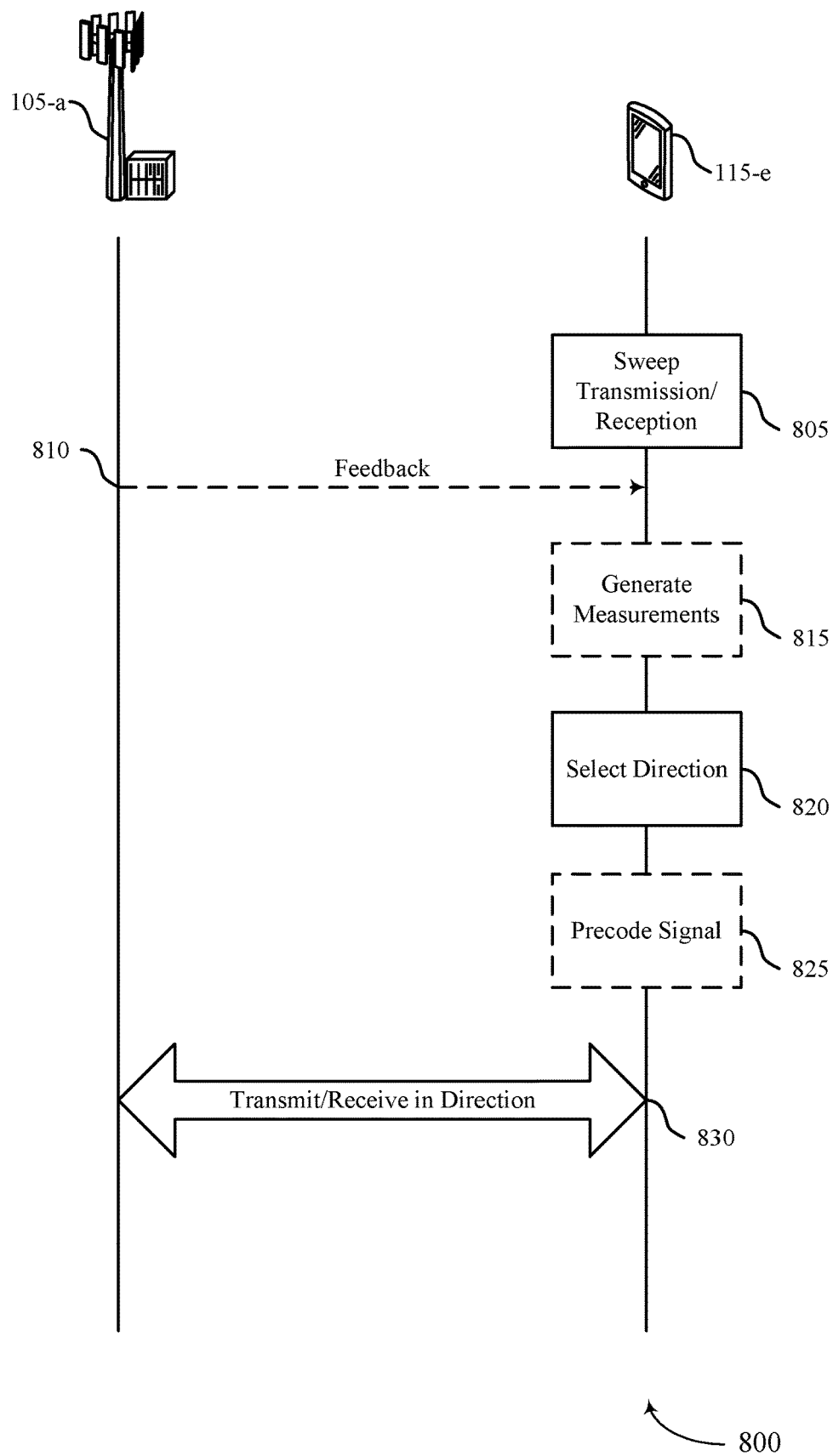
FIG. 8 illustrates an example of a process flow that supports quasi-linear antenna placement in mmW systems in accordance with aspects of the present disclosure.

FIG. 8 illustrates an example of a process flow 800 that supports quasi-linear antenna placement in mmW systems in accordance with aspects of the present disclosure. In some examples, process flow 800 may implement aspects of wireless communications system 100. Process flow 800 may include a base station 105-a, which may be an example of a base station 105 as described above with reference to FIG. 1. Additionally, process flow 800 may include a UE 115-e, which may be an example of a UE 115 as described above with reference to FIGS. 1-7. As described herein, UE 115-e may include a quasi-linear arrangement of patch antennas used for transmitting and receiving signals in a communications system (e.g., mmW system).

In the following description of the process flow 800, the operations between UE 115-e and base station 105-a may be performed in different orders or at different times. Certain operations may also be left out of the process flow 800, or other operations may be added to the process flow 800. It is to be understood that while UE 115-e is shown performing a number of the operations of process flow 800, any wireless device may perform the operations shown.

At 805, UE 115-e may control a set of phase shifters to transmit or receive respective phase shifted versions of signals over directional beams across a two-dimensional space via a set of patch antennas (e.g., antenna elements). As described herein, the set of patch antennas may be serially positioned (e.g., in a single row) along a perimeter of a housing of UE 115-e. For example, a first subset of patch antennas from the set of patch antennas may be linearly arranged along the perimeter, a second subset of patch antennas from the set of patch antennas may be linearly arranged along the perimeter and at an angle that is relative to the first subset of patch antennas, and at least one patch antenna of the set of patch antennas may be positioned in a non-linear arrangement relative to a first line formed by patch antennas included within the first subset and to a second line formed by patch antennas included within the second subset. In some cases, the angle of the second subset of patch antennas relative to the first subset of patch antennas may be thirty degrees or greater and less than or equal to ninety degrees.

At 810, UE 115-e may receive feedback from a receiving wireless device (e.g., base station 105-a) based on beam sweeping transmission of the respective phase shifted versions of the signals across the two-dimensional space via the set of patch antennas, where selecting the direction within the two-dimensional space is based on the feedback. The base station 105-a may indicate in the feedback which beam direction, of a set of beam directions, used by the UE 115-e is preferred by the base station 105-a. For example, the UE 115-e may cycle through a set of different beam directions over a set of TTIs (e.g., slots, mini-slots, symbol periods, etc.), and the base station 105-a may measure a signal to noise ratio, a signal to noise plus interference ratio, a receive power, or the like, in each TTI. The base station 105-a may indicate a particular TTI corresponding to a preferred beam direction.

At 815, UE 115-e may generate a set of measurements based on beam sweeping reception of the respective phase shifted versions of the signals across the two-dimensional space via the set of patch antennas, where selecting the direction is based on the set of measurements. The UE 115-e may, for example, sweep a receive beam across a set of different directions radiating outward from the patch antennas 405 within the two-dimensional space 440 (see FIG. 4) and take a measurement for each of the different directions (e.g., take a measurement within each TTI as the base station 105-a cycles through a set of different beam directions over a set of TTIs). The measurement may be, for example, a signal to noise ratio, a signal to noise plus interference ratio, a receive power, or the like. The UE 115-e may select the direction based on the measurements. For example, the UE 115-e may select the direction corresponding to a highest receive power, any direction having a measurement that satisfies a threshold (e.g., receive power measurement in one or more directions that meet or exceed a threshold), or the like.

At 820, UE 115-e may select a direction within the two-dimensional space in which to transmit or receive based on beam sweeping transmission or reception of the respective phase shifted versions of the signals via the set of patch antennas. The UE 115-e may select the direction to be the direction indicated in, or otherwise derived from, feedback 820 received from the base 105-a in response to beam sweeping transmission. In some examples, the UE 115-e may select the direction based on measurements obtained from beam sweeping reception.

At 825, UE 115-e may precode the signals to generate an L0 signal and an signal. In some cases, UE 115-e may output, by a first phase shifter of the set of phase shifters, a first weighted combination of the L0 signal and the L1 signal to a first polarization feed point (e.g., F1) of the at least one patch antenna positioned in the non-linear arrangement and may also output, by a second phase shifter of the set of phase shifters, a second weighted combination of the L0 signal and the L1 signal to a second polarization feed point (e.g., F2) of the at least one patch antenna positioned in the non-linear arrangement.

Additionally, UE 115-e may output, by a first subset of the set of phase shifters, a respective phase shifted version of the L0 signal to a respective first polarization feed point of the first subset of patch antennas and may output, by a second subset of the set of phase shifters, a respective phase shifted version of the L1 signal to a respective second polarization feed point of the first subset of patch antennas. Additionally or alternatively, UE 115-e may output, by a third subset of the set of phase shifters, a respective phase shifted version of the L0 signal to a respective first polarization feed point of the second subset of patch antennas and may output, by a fourth subset of the set of phase shifters, a respective phase shifted version of the L1 signal to a respective second polarization feed point of the second subset of patch antennas.

At 830, UE 115-e may transmit or receive respective phase shifted versions of signals via the set of patch antennas using the selected direction in the two-dimensional space 440.

Figure 9:
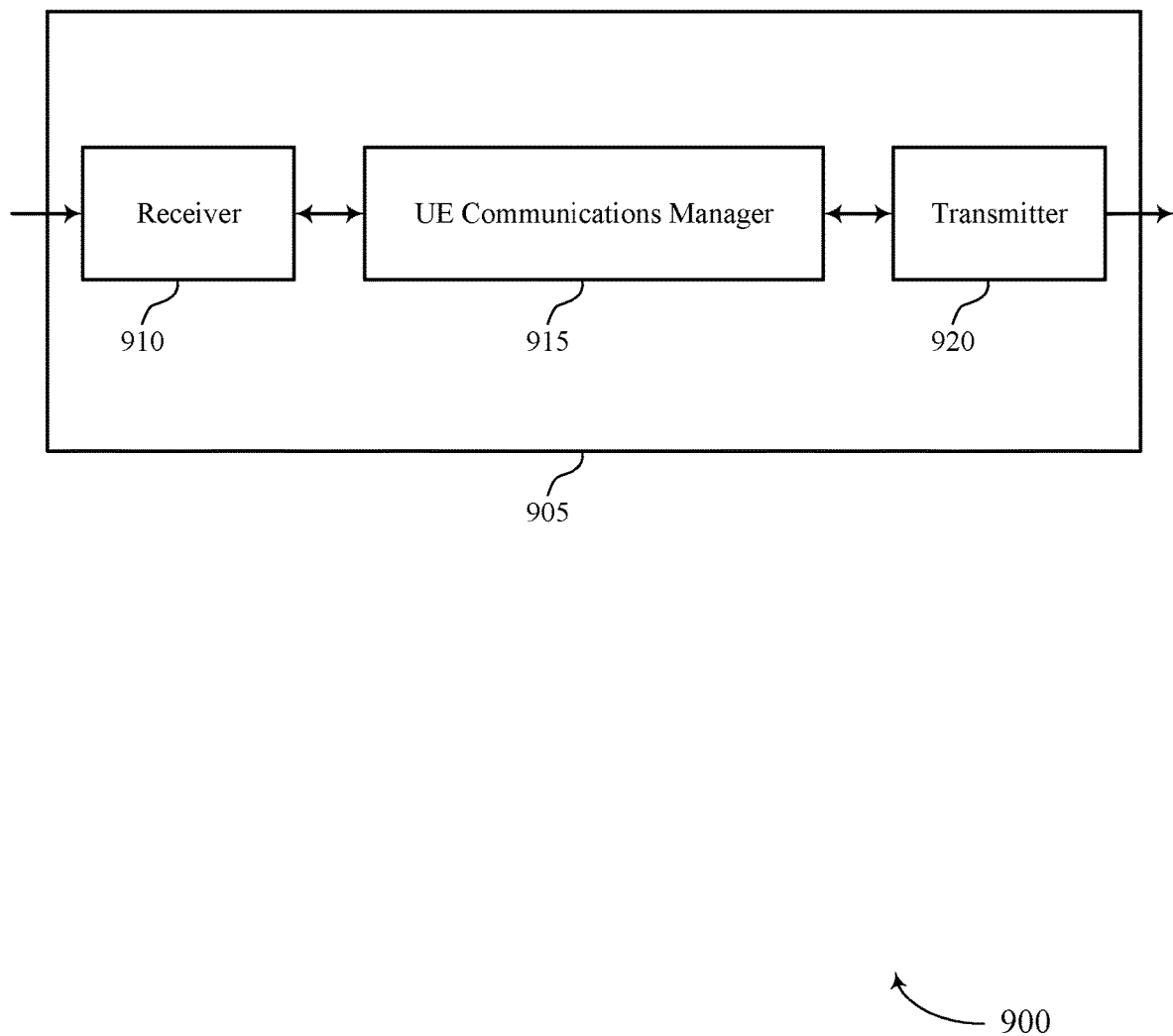
FIGS. 9 and 10 show block diagrams of devices that support quasi-linear antenna placement in mmW systems in accordance with aspects of the present disclosure.

FIG. 9 shows a block diagram 900 of a device 905 that supports quasi-linear antenna placement in mmW systems in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to quasi-linear antenna placement in mmW systems, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may control a set of phase shifters to transmit or receive respective phase shifted versions of signals over directional beams across a two-dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset. Additionally, the UE communications manager 915 may select a direction within the two-dimensional space in which to transmit or receive based on beam sweeping transmission or reception of the respective phase shifted versions of the signals via the set of patch antennas. The UE communications manager 915 may be an example of aspects of the UE communications manager 1210 described herein.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
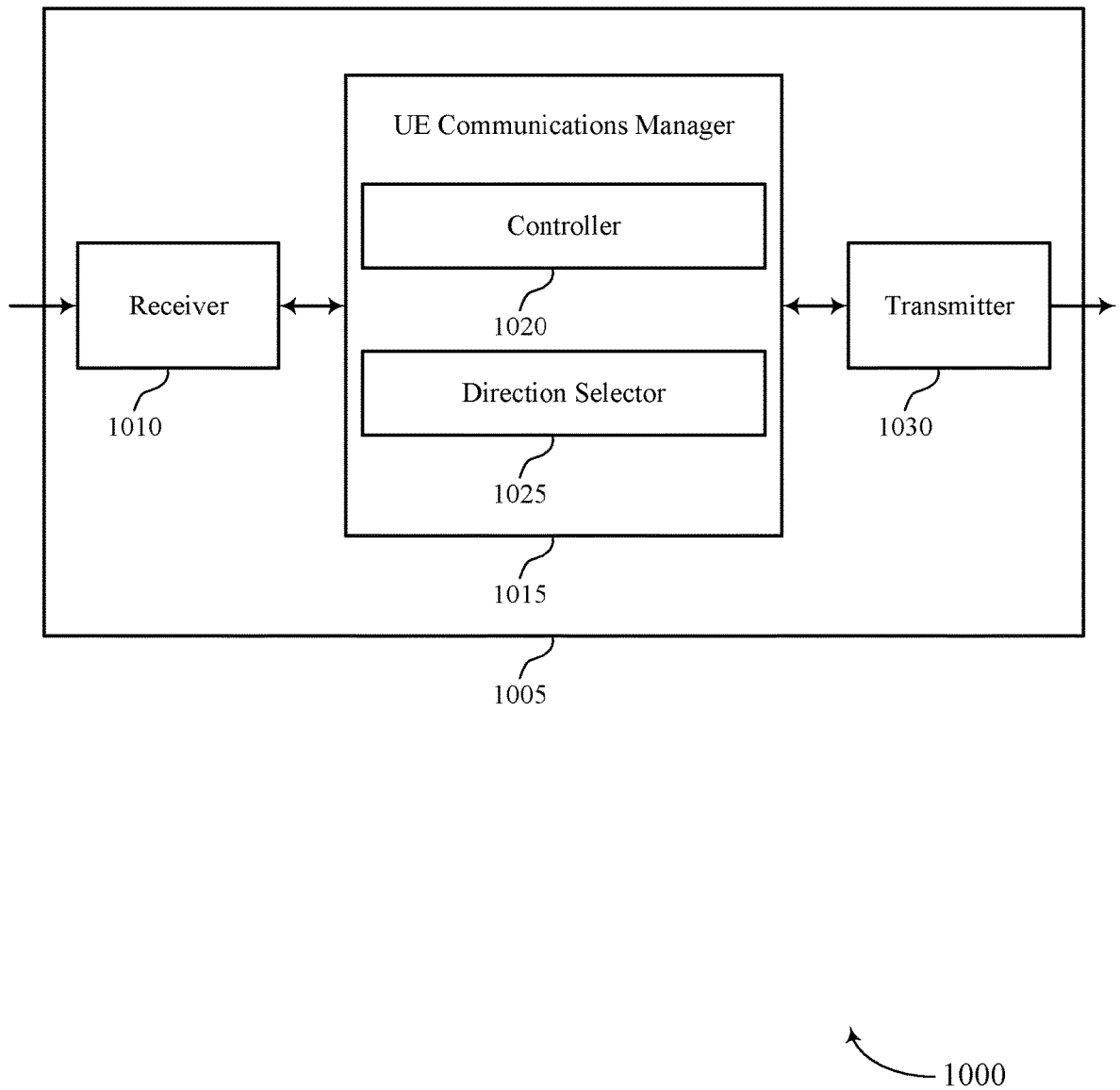

FIG. 10 shows a block diagram 1000 of a device 1005 that supports quasi-linear antenna placement in mmW systems in accordance with aspects of the present disclosure. The device 1005 may be an example of aspects of a device 905, or a UE 115 as described herein. The device 1005 may include a receiver 1010, a UE communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to quasi-linear antenna placement in mmW systems, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a controller 1020 and a direction selector 1025. The UE communications manager 1015 may be an example of aspects of the UE communications manager 1210 described herein.

The controller 1020 may control a set of phase shifters to transmit or receive respective phase shifted versions of signals over directional beams across a two-dimensional space via a set of patch antennas, the set of patch antennas serially positioned (e.g., in a single row) along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset.

The direction selector 1025 may select a direction within the two-dimensional space in which to transmit or receive based on beam sweeping transmission or reception of the respective phase shifted versions of the signals via the set of patch antennas.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
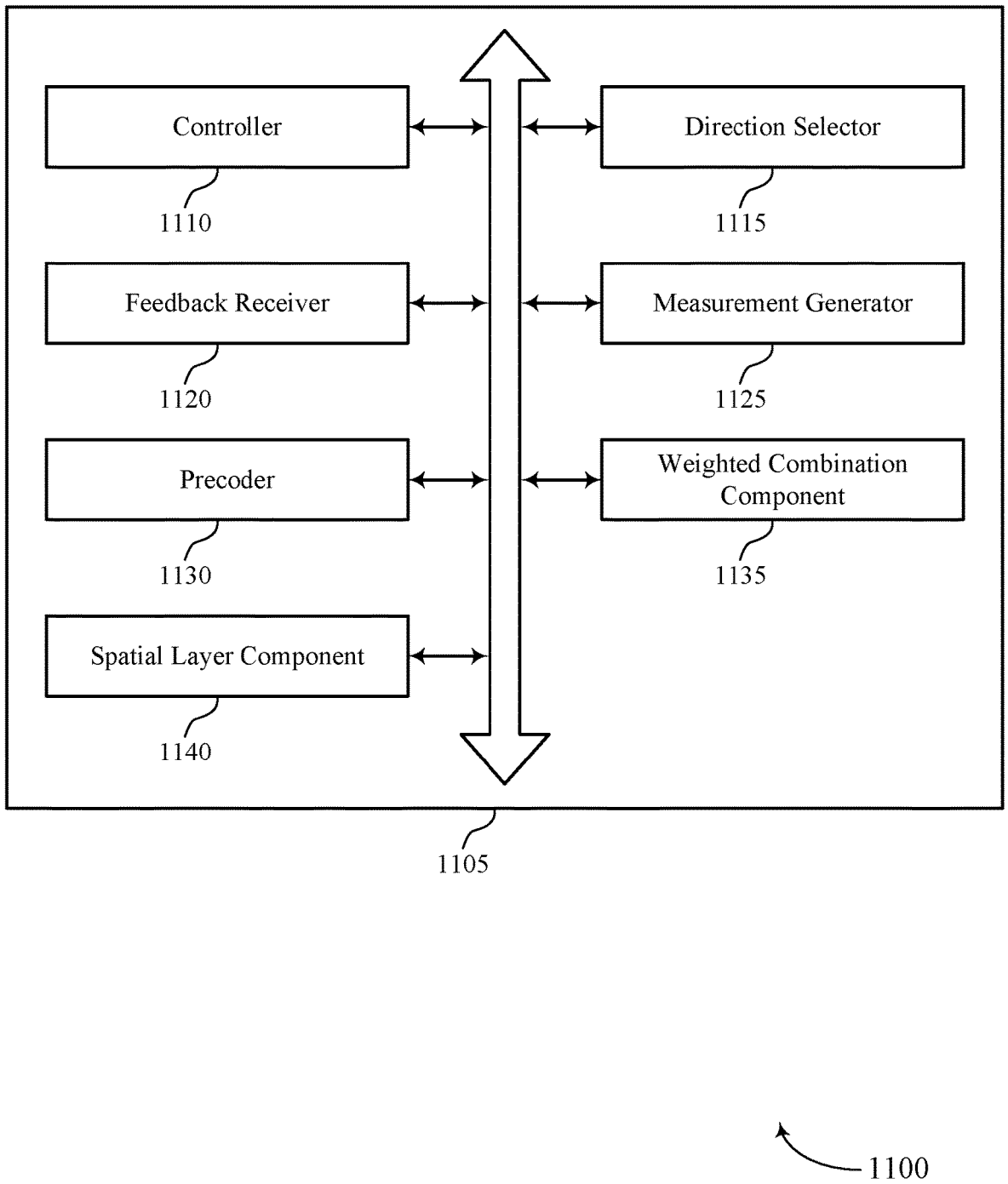
FIG. 11 shows a block diagram of a UE communications manager that supports quasi-linear antenna placement in mmW systems in accordance with aspects of the present disclosure.

FIG. 11 shows a block diagram 1100 of a UE communications manager 1105 that supports quasi-linear antenna placement in mmW systems in accordance with aspects of the present disclosure. The UE communications manager 1105 may be an example of aspects of a UE communications manager 915, a UE communications manager 1015, or a UE communications manager 1210 described herein. The UE communications manager 1105 may include a controller 1110, a direction selector 1115, a feedback receiver 1120, a measurement generator 1125, a precoder 1130, a weighted combination component 1135, and a spatial layer component 1140. Each of these modules may communicate, directly or indirectly, with one another (e.g., via one or more buses).

The controller 1110 may control a set of phase shifters to transmit or receive respective phase shifted versions of signals over directional beams across a two-dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset. In some cases, the angle of the second subset of patch antennas relative to the first subset of patch antennas may be thirty degrees or greater and less than or equal to ninety degrees.

The direction selector 1115 may select a direction within the two-dimensional space in which to transmit or receive based on beam sweeping transmission or reception of the respective phase shifted versions of the signals via the set of patch antennas.

The feedback receiver 1120 may receive feedback from a receiving wireless device based on beam sweeping transmission of the respective phase shifted versions of the signals across the two-dimensional space via the set of patch antennas, where selecting the direction within the two-dimensional space is based on the feedback.

The measurement generator 1125 may generate a set of measurements based on beam sweeping reception of the respective phase shifted versions of the signals across the two-dimensional space via the set of patch antennas, where selecting the direction is based on the set of measurements.

The precoder 1130 may precode the signals to generate a first spatial layer signal and a second spatial layer signal.

The weighted combination component 1135 may output, by a first phase shifter of the set of phase shifters, a first weighted combination of the first spatial layer signal and the second spatial layer signal to a first polarization feed point of the at least one patch antenna positioned in the non-linear arrangement. In some examples, the weighted combination component 1135 may output, by a second phase shifter of the set of phase shifters, a second weighted combination of the first spatial layer signal and the second spatial layer signal to a second polarization feed point of the at least one patch antenna positioned in the non-linear arrangement.

The spatial layer component 1140 may output, by a first subset of the set of phase shifters, a respective phase shifted version of the first spatial layer signal to a respective first polarization feed point of the first subset of patch antennas. In some examples, the spatial layer component 1140 may output, by a second subset of the set of phase shifters, a respective phase shifted version of the second spatial layer signal to a respective second polarization feed point of the first subset of patch antennas.

Additionally or alternatively, the spatial layer component 1140 may output, by a third subset of the set of phase shifters, a respective phase shifted version of the first spatial layer signal to a respective first polarization feed point of the second subset of patch antennas. The spatial layer component 1140 may also output, by a fourth subset of the set of phase shifters, a respective phase shifted version of the second spatial layer signal to a respective second polarization feed point of the second subset of patch antennas.

Figure 12:
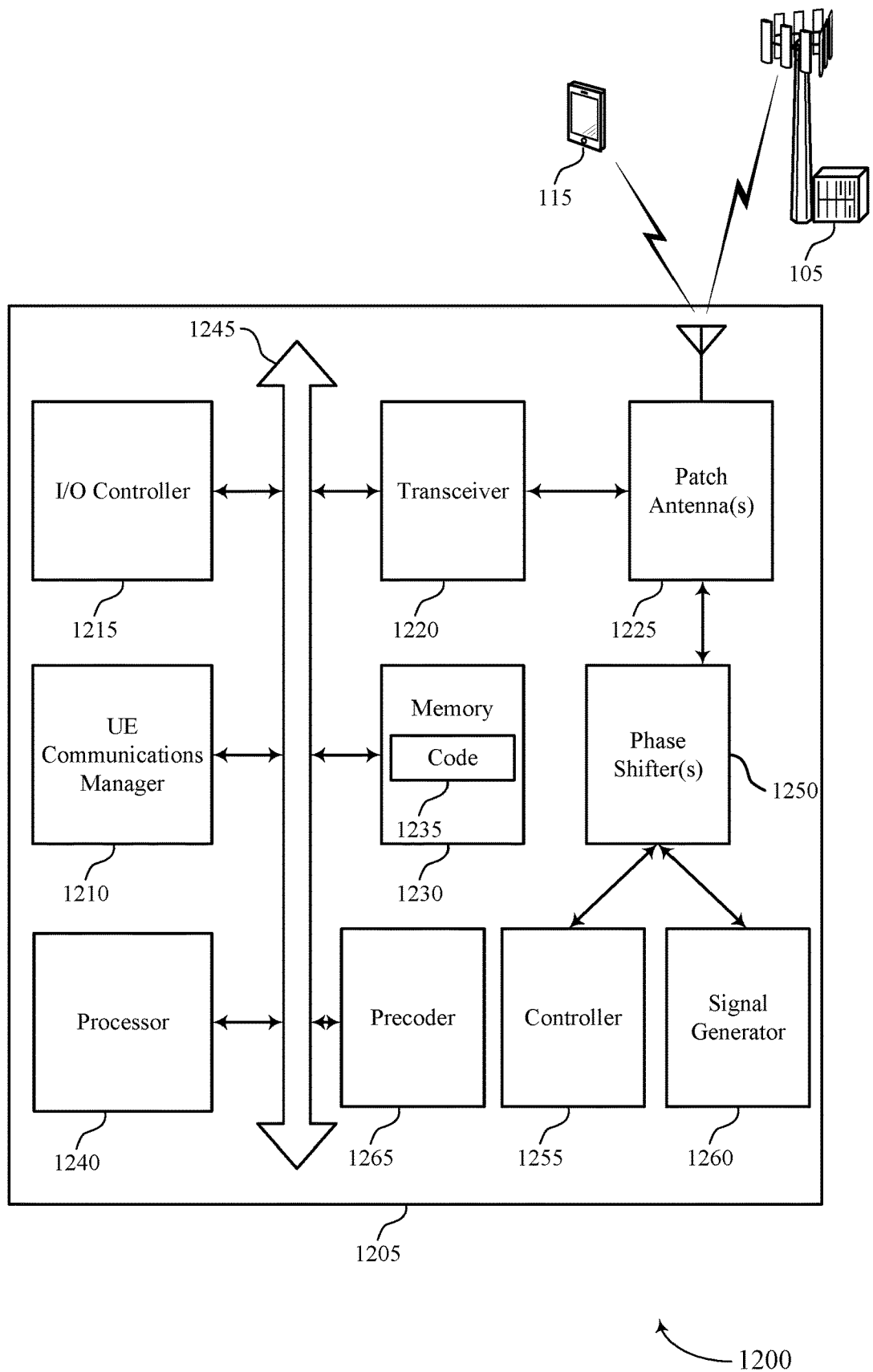
FIG. 12 shows a diagram of a system including a device that supports quasi-linear antenna placement in mmW systems in accordance with aspects of the present disclosure.

FIG. 12 shows a diagram of a system 1200 including a device 1205 that supports quasi-linear antenna placement in mmW systems in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 may control a set of phase shifters to transmit or receive respective phase shifted versions of signals over directional beams across a two-dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset. Additionally, the UE communications manager 1210 may select a direction within the two-dimensional space in which to transmit or receive based on beam sweeping transmission or reception of the respective phase shifted versions of the signals via the set of patch antennas.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions. For example, the wireless device may include a set of patch antennas 1225 serially positioned along a perimeter of a housing of the wireless device, a first subset of patch antennas 1225 from the set of patch antennas 1225 being linearly arranged along the perimeter, a second subset of patch antennas 1225 from the set of patch antennas 1225 being linearly arranged along the perimeter and at an angle that is relative to the first subset of patch antennas 1225, and at least one patch antenna 1225 of the set of patch antennas 1225 being positioned in a non-linear arrangement relative to a first line formed by patch antennas 1225 included within the first subset and to a second line formed by patch antennas 1225 included within the second subset. Additionally, the angle of the second subset of patch antennas relative to the first subset of patch antennas may be thirty degrees or greater and less than or equal to ninety degrees.

In some cases, the non-linear arrangement may be an arc defined by continuously mapping the first line with the second line. Additionally, the set of patch antennas 1225 serially positioned along the perimeter of the housing may be a conformal array of patch antennas 1225. In some cases, the set of patch antennas 1225 serially positioned along the perimeter of the housing may be a set of dual-polarized patch antennas. The housing may be a rounded rectangle, where the at least one patch antenna is positioned in a rounded corner of the rounded rectangle, the first subset of patch antennas are positioned along a first side of the rounded rectangle, and the second subset of patch antennas are positioned along a second side of the rounded rectangle, and where the set of patch antennas are oriented in any direction.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting quasi-linear antenna placement in mmW systems).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

In some cases, the device 1205 may include a set of phase shifters 1250, where each phase shifter of the set of phase shifters is electrically coupled to a respective patch antenna of the set of patch antennas 1225. The device 1205 may include a controller 1255 electrically coupled to the set of phase shifters 1250 and configured to control communication of signals via the set of patch antennas 1225 and the set of phase shifters 1250.

Additionally, the device 1205 may include a signal generator 1260 electrically coupled to the set of phase shifters 1250 and configured to generate the signals, where the controller 1255 is configured to cause the set of phase shifters 1250 to output respective phase shifted versions of the signals to the set of patch antennas 1225, and the set of patch antennas 1225 may be configured to wirelessly emit the respective phase shifted versions of the signals.

The controller 1255 may control the set of phase shifters 1250 to transmit the signals over directional beams across a two-dimensional space via the set of patch antennas 1225, receive feedback from a receiving wireless device based on beam sweeping transmission of the respective phase shifted versions of the signals via the set of patch antennas 1225 across the two-dimensional space, and select a direction within the two-dimensional space in which to transmit to the receiving wireless device based on the feedback. Additionally, the controller 1255 may generate a set of beam weights for the set of phase shifters 1250 based on the feedback.

Additionally or alternatively, the controller 1255 may control the set of phase shifters 1250 to receive the signals over directional beams across a two-dimensional space via the set of patch antennas 1225 and select a direction within the two-dimensional space in which to receive a transmission from a transmitting wireless device based on beam sweeping reception of respective phase shifted versions of the signals received via the set of patch antennas 1225 across the two-dimensional space. In some cases, the controller 1255 may then generate a set of measurements based on beam sweeping reception of the respective phase shifted versions of the signals received via the set of patch antennas 1225 across the two-dimensional space, where selecting the direction is based on the set of measurements. Additionally, the controller 1255 may generate a set of beam weights for the set of phase shifters 1250 based on the set of measurements.

In some cases, the device 1205 may include a precoder 1265 that is configured to precode the signals to generate a first spatial layer signal and a second spatial layer signal. Accordingly, a first phase shifter of the set of phase shifters 1250 may be electrically coupled to output a phase shifted version of the first spatial layer signal to a first polarization feed point and a second polarization feed point of the at least one patch antenna positioned in the non-linear arrangement, and a second phase shifter of the set of phase shifters 1250 may be electrically coupled to output a phase shifted version of the second spatial layer signal to the first polarization feed point and the second polarization feed point of the at least one patch antenna positioned in the non-linear arrangement.

Additionally or alternatively, a first set of phase shifters 1250 of the set of phase shifters 1250 may be configured to output a respective phase shifted version of the first spatial layer signal to a respective first polarization feed point of the first subset of patch antennas 1225, and a second set of phase shifters 1250 of the set of phase shifters 1250 may be configured to output a respective phase shifted version of the second spatial layer signal to a respective second polarization feed point of the first subset of patch antennas 1225. Further, a third set of phase shifters 1250 of the set of phase shifters 1250 may be configured to output a respective phase shifted version of the first spatial layer signal to a respective first polarization feed point of the second subset of patch antennas 1225, and a fourth set of phase shifters 1250 of the set of phase shifters 1250 may be configured to output a respective phase shifted version of the second spatial layer signal to a respective second polarization feed point of the second subset of patch antennas 1225.

Additionally or alternatively, a first phase shifter of the set of phase shifters 1250 may be configured to output a first weighted combination of the first and second spatial layer signals to a first polarization feed point of the at least one patch antenna positioned in the non-linear arrangement, and a second phase shifter of the set of phase shifters 1250 may be configured to output a second weighted combination of the first and second spatial layer signals to a second polarization feed point of the at least one patch antenna positioned in the non-linear arrangement. Accordingly, weights for combining the first and second spatial layer signals to form the first weighted combination, the second weighted combination, or both, may be a function of a position of the at least one patch antenna relative to the first subset of patch antennas 1225 and the second subset of patch antennas 1225.

FIG. 13 shows a flowchart illustrating a method 1300 that supports quasi-linear antenna placement in mmW systems in accordance with aspects of the present disclosure. The operations of method 1300 may be implemented by a UE 115 or its components as described herein. For example, the operations of method 1300 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1305, the UE may control a set of phase shifters to transmit or receive respective phase shifted versions of signals over directional beams across a two-dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset. The operations of 1305 may be performed according to the methods described herein. In some examples, aspects of the operations of 1305 may be performed by a controller as described with reference to FIGS. 9 through 12.

At 1310, the UE may select a direction within the two-dimensional space in which to transmit or receive based on beam sweeping transmission or reception of the respective phase shifted versions of the signals via the set of patch antennas. The operations of 1310 may be performed according to the methods described herein. In some examples, aspects of the operations of 1310 may be performed by a direction selector as described with reference to FIGS. 9 through 12.

Figure 14:
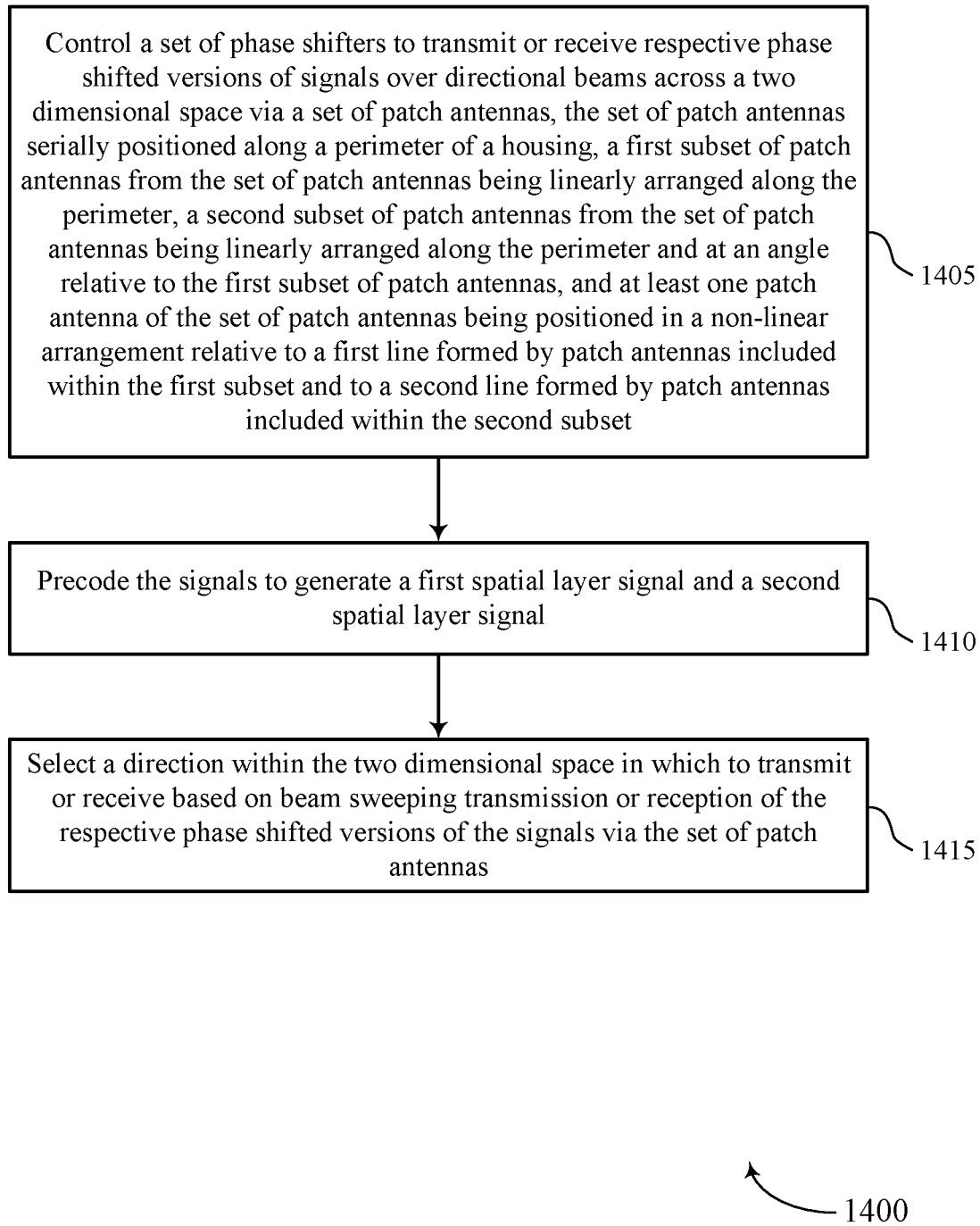

FIG. 14 shows a flowchart illustrating a method 1400 that supports quasi-linear antenna placement in mmW systems in accordance with aspects of the present disclosure. The operations of method 1400 may be implemented by a UE 115 or its components as described herein. For example, the operations of method 1400 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1405, the UE may control a set of phase shifters to transmit or receive respective phase shifted versions of signals over directional beams across a two-dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset. The operations of 1405 may be performed according to the methods described herein. In some examples, aspects of the operations of 1405 may be performed by a controller as described with reference to FIGS. 9 through 12.

At 1410, the UE may precode the signals to generate a first spatial layer signal and a second spatial layer signal. The operations of 1410 may be performed according to the methods described herein. In some examples, aspects of the operations of 1410 may be performed by a precoder as described with reference to FIGS. 9 through 12.

At 1415, the UE may select a direction within the two-dimensional space in which to transmit or receive based on beam sweeping transmission or reception of the respective phase shifted versions of the signals via the set of patch antennas. The operations of 1415 may be performed according to the methods described herein. In some examples, aspects of the operations of 1415 may be performed by a direction selector as described with reference to FIGS. 9 through 12.

Figure 15:
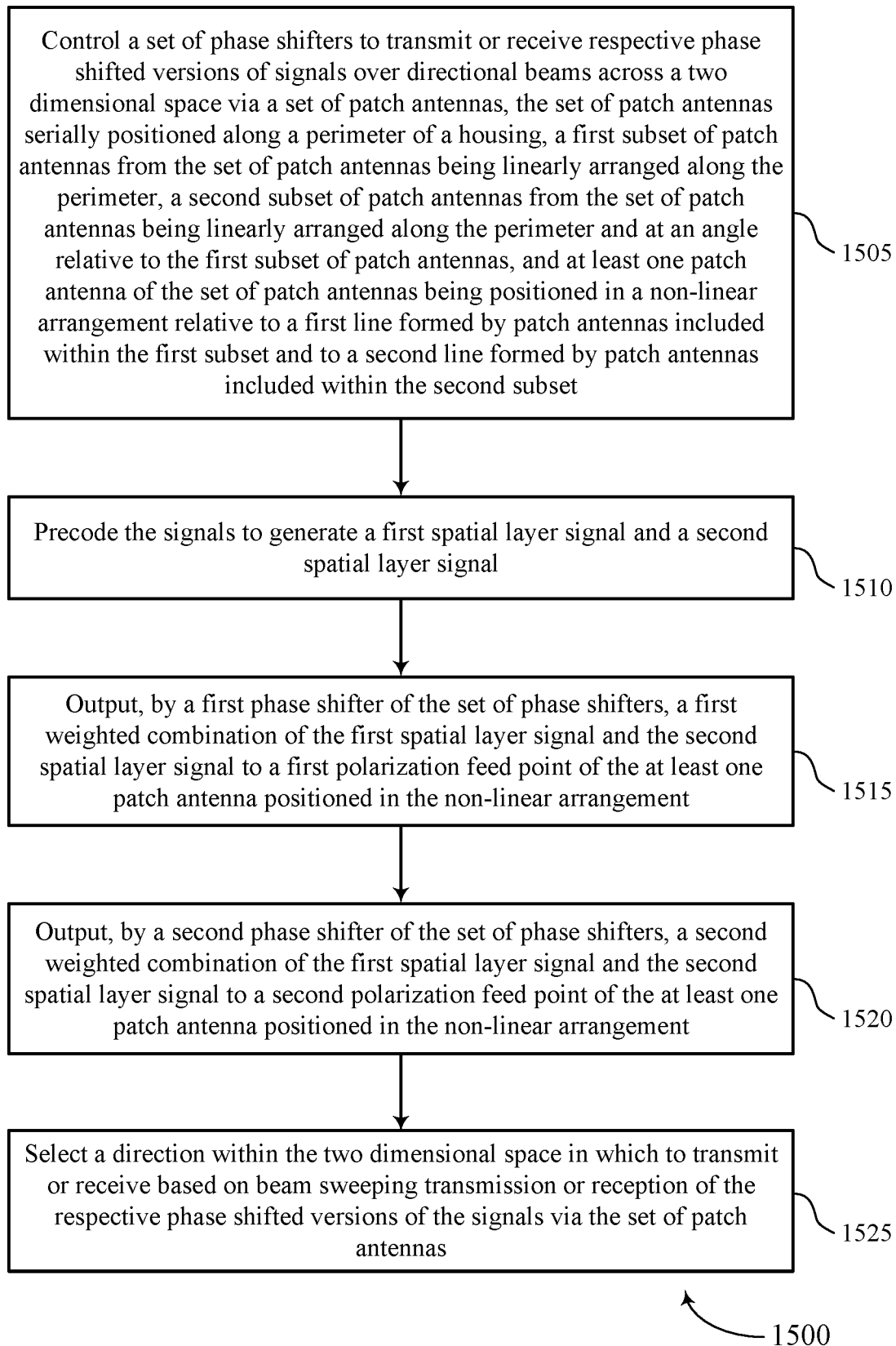

FIG. 15 shows a flowchart illustrating a method 1500 that supports quasi-linear antenna placement in mmW systems in accordance with aspects of the present disclosure. The operations of method 1500 may be implemented by a UE 115 or its components as described herein. For example, the operations of method 1500 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1505, the UE may control a set of phase shifters to transmit or receive respective phase shifted versions of signals over directional beams across a two-dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset. The operations of 1505 may be performed according to the methods described herein. In some examples, aspects of the operations of 1505 may be performed by a controller as described with reference to FIGS. 9 through 12.

At 1510, the UE may precode the signals to generate a first spatial layer signal and a second spatial layer signal. The operations of 1510 may be performed according to the methods described herein. In some examples, aspects of the operations of 1510 may be performed by a precoder as described with reference to FIGS. 9 through 12.

At 1515, the UE may output, by a first phase shifter of the set of phase shifters, a first weighted combination of the first spatial layer signal and the second spatial layer signal to a first polarization feed point of the at least one patch antenna positioned in the non-linear arrangement. The operations of 1515 may be performed according to the methods described herein. In some examples, aspects of the operations of 1515 may be performed by a weighted combination component as described with reference to FIGS. 9 through 12.

At 1520, the UE may output, by a second phase shifter of the set of phase shifters, a second weighted combination of the first spatial layer signal and the second spatial layer signal to a second polarization feed point of the at least one patch antenna positioned in the non-linear arrangement. The operations of 1520 may be performed according to the methods described herein. In some examples, aspects of the operations of 1520 may be performed by a weighted combination component as described with reference to FIGS. 9 through 12.

At 1525, the UE may select a direction within the two-dimensional space in which to transmit or receive based on beam sweeping transmission or reception of the respective phase shifted versions of the signals via the set of patch antennas. The operations of 1525 may be performed according to the methods described herein. In some examples, aspects of the operations of 1525 may be performed by a direction selector as described with reference to FIGS. 9 through 12.

Figure 16:
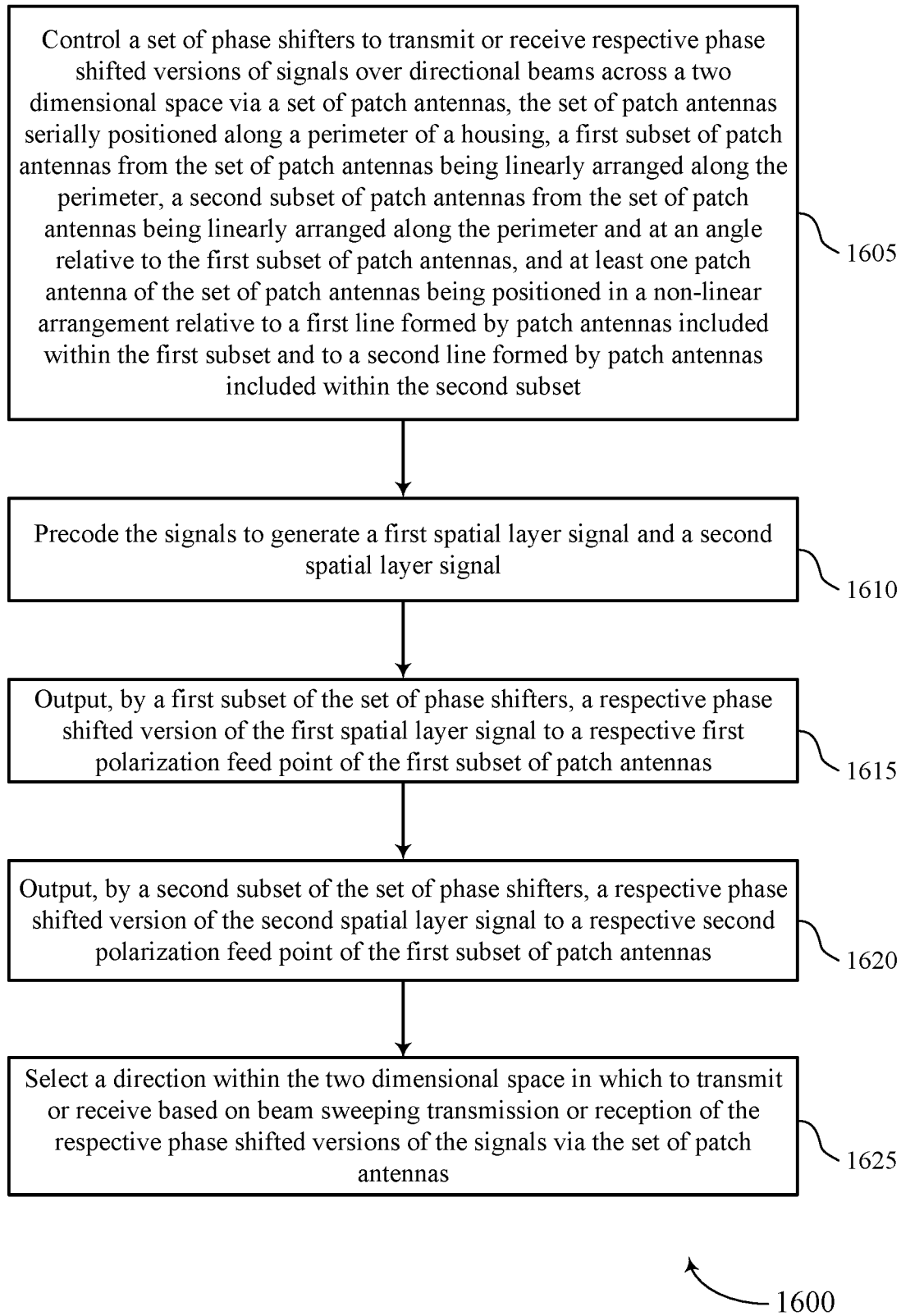

FIG. 16 shows a flowchart illustrating a method 1600 that supports quasi-linear antenna placement in mmW systems in accordance with aspects of the present disclosure. The operations of method 1600 may be implemented by a UE 115 or its components as described herein. For example, the operations of method 1600 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1605, the UE may control a set of phase shifters to transmit or receive respective phase shifted versions of signals over directional beams across a two-dimensional space via a set of patch antennas, the set of patch antennas serially positioned along a perimeter of a housing, a first subset of patch antennas from the set of patch antennas being linearly arranged along the perimeter, a second subset of patch antennas from the set of patch antennas being linearly arranged along the perimeter and at an angle that is relative to the first subset of patch antennas, and at least one patch antenna of the set of patch antennas being positioned in a non-linear arrangement relative to a first line formed by patch antennas included within the first subset and to a second line formed by patch antennas included within the second subset. The operations of 1605 may be performed according to the methods described herein. In some examples, aspects of the operations of 1605 may be performed by a controller as described with reference to FIGS. 9 through 12.

At 1610, the UE may precode the signals to generate a first spatial layer signal and a second spatial layer signal. The operations of 1610 may be performed according to the methods described herein. In some examples, aspects of the operations of 1610 may be performed by a precoder as described with reference to FIGS. 9 through 12.

At 1615, the UE may output, by a first subset of the set of phase shifters, a respective phase shifted version of the first spatial layer signal to a respective first polarization feed point of the first subset of patch antennas. The operations of 1615 may be performed according to the methods described herein. In some examples, aspects of the operations of 1615 may be performed by a spatial layer component as described with reference to FIGS. 9 through 12.

At 1620, the UE may output, by a second subset of the set of phase shifters, a respective phase shifted version of the second spatial layer signal to a respective second polarization feed point of the first subset of patch antennas. The operations of 1620 may be performed according to the methods described herein. In some examples, aspects of the operations of 1620 may be performed by a spatial layer component as described with reference to FIGS. 9 through 12.

At 1625, the UE may select a direction within the two-dimensional space in which to transmit or receive based on beam sweeping transmission or reception of the respective phase shifted versions of the signals via the set of patch antennas. The operations of 1625 may be performed according to the methods described herein. In some examples, aspects of the operations of 1625 may be performed by a direction selector as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a plurality of patch antennas serially positioned along a perimeter of a housing of the apparatus, a first subset of patch antennas from the plurality of patch antennas being linearly arranged along the perimeter, a second subset of patch antennas from the plurality of patch antennas being linearly arranged along the perimeter and at an angle that is relative to the first subset of patch antennas, and at least one patch antenna of the plurality of patch antennas being positioned in a non-linear arrangement relative to a first line formed by patch antennas included within the first subset and to a second line formed by patch antennas included within the second subset;
a plurality of phase shifters, wherein each phase shifter of the plurality of phase shifters is electrically coupled to a respective patch antenna of the plurality of patch antennas; and
a controller electrically coupled to the plurality of phase shifters and configured to control communication of signals via the plurality of patch antennas and the plurality of phase shifters, wherein the controller is configured to:
control the plurality of phase shifters to receive the signals over directional beams across a two-dimensional space via the plurality of patch antennas; and
select a direction within the two-dimensional space in which to receive a transmission from a transmitting wireless device based at least in part on beam sweeping reception of respective phase shifted versions of the signals received via the plurality of patch antennas across the two-dimensional space.

2. The apparatus of claim 1, wherein the non-linear arrangement is an arc defined by continuously mapping the first line with the second line.

3. The apparatus of claim 1, further comprising:
a signal generator electrically coupled to the plurality of phase shifters and configured to generate the signals, wherein the controller is configured to cause the plurality of phase shifters to output respective phase shifted versions of the signals to the plurality of patch antennas, and the plurality of patch antennas are configured to wirelessly emit the respective phase shifted versions of the signals.

4. The apparatus of claim 3, wherein the controller is configured to:
control the plurality of phase shifters to transmit the signals over directional beams across a two-dimensional space via the plurality of patch antennas;
receive feedback from a receiving wireless device based at least in part on beam sweeping transmission of the respective phase shifted versions of the signals via the plurality of patch antennas across the two-dimensional space; and
select a direction within the two-dimensional space in which to transmit to the receiving wireless device based at least in part on the feedback.

5. The apparatus of claim 4, wherein the controller is configured to:
generate a set of beam weights for the plurality of phase shifters based at least in part on the feedback.

6. The apparatus of claim 1, wherein the controller is configured to cause the plurality of phase shifters to output respective phase shifted versions of the signals received via the plurality of patch antennas.

7. The apparatus of claim 1, wherein the controller is configured to:
generate a plurality of measurements based at least in part on beam sweeping reception of the respective phase shifted versions of the signals received via the plurality of patch antennas across the two-dimensional space, wherein selecting the direction is based at least in part on the plurality of measurements.

8. The apparatus of claim 7, wherein the controller is configured to:
generate a set of beam weights for the plurality of phase shifters based at least in part on the plurality of measurements.

9. The apparatus of claim 1, wherein the housing is a rounded rectangle, the at least one patch antenna is positioned in a rounded corner of the rounded rectangle, the first subset of patch antennas are positioned along a first side of the rounded rectangle, and the second subset of patch antennas are positioned along a second side of the rounded rectangle, and wherein each patch antenna of the plurality of patch antennas is oriented in any direction.

10. The apparatus of claim 1, further comprising:
a precoder configured to precode the signals to generate a first spatial layer signal and a second spatial layer signal.

11. The apparatus of claim 10, further comprising:
a first phase shifter of the plurality of phase shifters configured to output a first weighted combination of the first and second spatial layer signals to a first polarization feed point of the at least one patch antenna positioned in the non-linear arrangement; and a second phase shifter of the plurality of phase shifters configured to output a second weighted combination of the first and second spatial layer signals to a second polarization feed point of the at least one patch antenna positioned in the non-linear arrangement.

12. The apparatus of claim 11, wherein weights for combining the first and second spatial layer signals to form the first weighted combination, the second weighted combination, or both, are a function of a position of the at least one patch antenna relative to the first subset of patch antennas and the second subset of patch antennas.

13. The apparatus of claim 10, wherein a first phase shifter of the plurality of phase shifters is electrically coupled to output a phase shifted version of the first spatial layer signal to a first polarization feed point and a second polarization feed point of the at least one patch antenna positioned in the non-linear arrangement; and
wherein a second phase shifter of the plurality of phase shifters is electrically coupled to output a phase shifted version of the second spatial layer signal to the first polarization feed point and the second polarization feed point of the at least one patch antenna positioned in the non-linear arrangement.

14. The apparatus of claim 10, wherein a first plurality of phase shifters of the plurality of phase shifters are configured to output a respective phase shifted version of the first spatial layer signal to a respective first polarization feed point of the first subset of patch antennas, and
wherein a second plurality of phase shifters of the plurality of phase shifters are configured to output a respective phase shifted version of the second spatial layer signal to a respective second polarization feed point of the first subset of patch antennas.

15. The apparatus of claim 14, wherein a third plurality of phase shifters of the plurality of phase shifters are configured to output a respective phase shifted version of the first spatial layer signal to a respective first polarization feed point of the second subset of patch antennas, and
wherein a fourth plurality of phase shifters of the plurality of phase shifters are configured to output a respective phase shifted version of the second spatial layer signal to a respective second polarization feed point of the second subset of patch antennas.

16. The apparatus of claim 1, wherein the plurality of patch antennas serially positioned along the perimeter of the housing is a conformal array of patch antennas.

17. The apparatus of claim 1, wherein the plurality of patch antennas serially positioned along the perimeter of the housing is a plurality of dual-polarized patch antennas.

18. The apparatus of claim 1, wherein the angle of the second subset of patch antennas relative to the first subset of patch antennas is thirty degrees or greater and less than or equal to ninety degrees.

19. A method for wireless communication, comprising:
controlling a plurality of phase shifters to transmit or receive respective phase shifted versions of signals over directional beams across a two-dimensional space via a plurality of patch antennas, the plurality of patch antennas serially positioned along a perimeter of a housing, a first subset of patch antennas from the plurality of patch antennas being linearly arranged along the perimeter, a second subset of patch antennas from the plurality of patch antennas being linearly arranged along the perimeter and at an angle that is relative to the first subset of patch antennas, and at least one patch antenna of the plurality of patch antennas being positioned in a non-linear arrangement relative to a first line formed by patch antennas included within the first subset and to a second line formed by patch antennas included within the second subset; and
selecting a direction within the two-dimensional space in which to transmit or receive based at least in part on beam sweeping transmission or reception of the respective phase shifted versions of the signals via the plurality of patch antennas.

20. The method of claim 19, further comprising:
receiving feedback from a receiving wireless device based at least in part on beam sweeping transmission of the respective phase shifted versions of the signals across the two-dimensional space via the plurality of patch antennas, wherein selecting the direction within the two-dimensional space is based at least in part on the feedback.

21. The method of claim 19, further comprising:
generating a plurality of measurements based at least in part on beam sweeping reception of the respective phase shifted versions of the signals across the two-dimensional space via the plurality of patch antennas, wherein selecting the direction is based at least in part on the plurality of measurements.

22. The method of claim 19, further comprising:
precoding the signals to generate a first spatial layer signal and a second spatial layer signal.

23. The method of claim 22, wherein controlling the plurality of phase shifters further comprises:
outputting, by a first phase shifter of the plurality of phase shifters, a first weighted combination of the first spatial layer signal and the second spatial layer signal to a first polarization feed point of the at least one patch antenna positioned in the non-linear arrangement; and
outputting, by a second phase shifter of the plurality of phase shifters, a second weighted combination of the first spatial layer signal and the second spatial layer signal to a second polarization feed point of the at least one patch antenna positioned in the non-linear arrangement.

24. The method of claim 22, wherein controlling the plurality of phase shifters further comprises:
outputting, by a first subset of the plurality of phase shifters, a respective phase shifted version of the first spatial layer signal to a respective first polarization feed point of the first subset of patch antennas; and
outputting, by a second subset of the plurality of phase shifters, a respective phase shifted version of the second spatial layer signal to a respective second polarization feed point of the first subset of patch antennas.

25. The method of claim 24, wherein controlling the plurality of phase shifters further comprises:
outputting, by a third subset of the plurality of phase shifters, a respective phase shifted version of the first spatial layer signal to a respective first polarization feed point of the second subset of patch antennas; and
outputting, by a fourth subset of the plurality of phase shifters, a respective phase shifted version of the second spatial layer signal to a respective second polarization feed point of the second subset of patch antennas.

26. An apparatus for wireless communication, comprising:
means for controlling a plurality of phase shifters to transmit or receive respective phase shifted versions of signals over directional beams across a two-dimensional space via a plurality of patch antennas, the plurality of patch antennas serially positioned along a perimeter of a housing, a first subset of patch antennas from the plurality of patch antennas being linearly arranged along the perimeter, a second subset of patch antennas from the plurality of patch antennas being linearly arranged along the perimeter and at an angle that is relative to the first subset of patch antennas, and at least one patch antenna of the plurality of patch antennas being positioned in a non-linear arrangement relative to a first line formed by patch antennas included within the first subset and to a second line formed by patch antennas included within the second subset; and means for selecting a direction within the two-dimensional space in which to transmit or receive based at least in part on beam sweeping transmission or reception of the respective phase shifted versions of the signals via the plurality of patch antennas.

27. The apparatus of claim 26, wherein the means for controlling the plurality of phase shifters further comprises:

means for outputting, by a first phase shifter of the plurality of phase shifters, a first weighted combination of a first spatial layer signal and a second spatial layer signal to a first polarization feed point of the at least one patch antenna positioned in the non-linear arrangement; and means for outputting, by a second phase shifter of the plurality of phase shifters, a second weighted combination of the first spatial layer signal and the second spatial layer signal to a second polarization feed point of the at least one patch antenna positioned in the non-linear arrangement.

28. The apparatus of claim 26, wherein the means for controlling the plurality of phase shifters further comprises:

means for outputting, by a first subset of the plurality of phase shifters, a respective phase shifted version of a first spatial layer signal to a respective first polarization feed point of the first subset of patch antennas; and means for outputting, by a second subset of the plurality of phase shifters, a respective phase shifted version of a second spatial layer signal to a respective second polarization feed point of the first subset of patch antennas.

29. A non-transitory computer-readable medium storing code for wireless communication, the code comprising instructions executable by a processor to:

control a plurality of phase shifters to transmit or receive respective phase shifted versions of signals over directional beams across a two-dimensional space via a plurality of patch antennas, the plurality of patch antennas serially positioned along a perimeter of a housing, a first subset of patch antennas from the plurality of patch antennas being linearly arranged along the perimeter, a second subset of patch antennas from the plurality of patch antennas being linearly arranged along the perimeter and at an angle that is relative to the first subset of patch antennas, and at least one patch antenna of the plurality of patch antennas being positioned in a non-linear arrangement relative to a first line formed by patch antennas included within the first subset and to a second line formed by patch antennas included within the second subset; and select a direction within the two-dimensional space in which to transmit or receive based at least in part on beam sweeping transmission or reception of the respective phase shifted versions of the signals via the plurality of patch antennas.

* * * * *